US007521506B2

(12) United States Patent  (10) Patent No.: US 7,521,506 B2
Muller                     (45) Date of Patent: Apr. 21, 2009

(54) EMULSIFIER-FREE MICROGEL

(75) Inventor: Horst Muller, Cologne (DE)

(73) Assignee: Bollig & Kemper GmbH & Co. KG, Cologne (DE)

( * ) Notice: Subject to any disclaimer, the term of this patent is extended or adjusted under 35 U.S.C. 154(b) by 527 days.

(21) Appl. No.: 10/536,964

(22) PCT Filed: Oct. 13, 2003

(86) PCT No.: PCT/DE03/03418

§ 371 (c)(1),
(2), (4) Date: May 31, 2005

(87) PCT Pub. No.: WO2004/035646

PCT Pub. Date: Apr. 29, 2004

(65) Prior Publication Data

US 2006/0128859 A1  Jun. 15, 2006

(30) Foreign Application Priority Data

Oct. 14, 2002 (DE) ................. 102 47 845
Oct. 14, 2002 (DE) ................. 102 47 846
Oct. 14, 2002 (DE) ................. 102 47 848

(51) Int. Cl.
    C08G 18/08  (2006.01)
(52) U.S. Cl. ...................................... 524/839
(58) Field of Classification Search ............. 524/839
    See application file for complete search history.

(56) References Cited

U.S. PATENT DOCUMENTS 5,738,912 A * 4/1998 Konig et al. ............... 427/389
6,462,139 B1 10/2002 Das et al. ............... 525/329.9

FOREIGN PATENT DOCUMENTS

DE   36 06 513 A1   9/1987
DE   39 32 816 A1   4/1991
DE   41 22 266 A1   1/1993
DE   195 48 030 A1  6/1997
EP   0 802 244 A1   10/1997
WO   WO 00/63266   10/2000

* cited by examiner

Primary Examiner—Edward J Cain
(74) Attorney, Agent, or Firm—Occhiuti Rohlicek & Tsao LLP

(57) ABSTRACT

Emulgator-free microgel dispersion and its use.

58 Claims, No Drawings

EMULSIFIER-FREE MICROGEL

The present invention relates to a microgel and its use in a multilayer coating, in particular in the production painting of automobile bodies.

A multilayer coating totaling four different layers (four-stage system) is generally used for the production painting of automobile bodies, in which these four layers are applied in succession at separate paint stations:

The first layer located directly on the vehicle sheet metal is an electrophoretically applied coating (electrocoat layer, cathodic dip coating layer) which is applied by electro dip coating—mainly cathodic dip coating (CED)—for corrosion protection and subsequently baked.

The second layer, on top of the electrocoat, is a primer-surfacer about 30 to 40 µm thick which on the one hand offers protection against mechanical attack (stone chip protection) and on the other hand ensures adequate holdout for the topcoat, i.e. it smoothes the rough surface of the body for the following topcoat and fills minor irregularities. The paints used to produce this primer-surfacer coat contain pigments as well as binders. The wettability of the pigments used has an effect on the topcoat holdout of the entire multi-stage finish and also on the gloss of the primer-surfacer, as demanded by some automobile manufacturers. The primer-surfacer coat is usually applied with electrostatic high-speed rotary bells and subsequent baked at temperatures above 130° C.

The third layer on top of the primer-surfacer is the basecoat which gives the desired color to the body through the corresponding pigments. The basecoat is applied in a conventional spraying method. The film thickness of this conventional basecoat is between about 12 and 15 µm, depending on the color. This layer is generally applied in two steps, particularly with metallic effect paints. In a first step, the paint is applied by means of electrostatic high-speed rotary bells, followed by a second application by means of pneumatic atomization. This coat (when using water-based basecoat) is intermediate dried using infra-red heaters and/or warm air convection.

The fourth and topmost layer on top of the basecoat is the clearcoat which is usually applied in one pass by electrostatic high-speed rotary bells. It gives the body the desired gloss and protects the basecoat from the effects of the environment (UV radiation, salt water, etc.).

Finally, the basecoat and the clearcoat are baked together.

A waterborne basecoat, or a basecoat layer produced from it which can be used in this multilayer coating, is subject to additional basic requirements besides its color-imparting properties:

For one, the basecoat in its cured state must result in optimal orientation of the aluminum flakes used as effect pigments. This property, known by the term "flop effect", is of crucial importance for any metallic finish. A particularly good "flop effect" is achieved when the tiny platelet-shaped effect pigments are aligned as evenly as possible at a shallow angle to the paint layer.

In addition, the basecoat must have a precisely specified adhesion to the paint layers below and above it. The basecoat has a decisive influence on the stone chip resistance of the originating multilayer coating of production automobile bodies. It should be noted in this connection that stone chip resistance is a known as a "k.o. criterion," i.e. only those multilayer coatings which have previously passed the VDA stone chip test can be used in production operations. The final multilayer coating passes the test if, under a precisely defined mechanical load, it exhibits chipping which does not exceed a certain area and is attributable to a separation of the basecoat from the primer-surfacer coat underneath it. Consequently, the adhesion of the basecoat must be adjusted in such a way that it is high enough so that the clearcoat does not separate from it, but is low enough not to pull the primer-surfacer with it when chipped by a stone, which would otherwise result in considerable corrosion damage to the automobile body.

Secondly, the basecoat must have good applicability. This means that whenever possible a high enough film build can be achieved in one pass so that adequate hiding is ensured. If only 17 µm thickness is required in the basecoat for black, a color which hides well, at least 45 µm is required for white, a color which does not hide well. Applying a film thickness like this in one pass still presents a considerable problem since the waterborne basecoat must possess the corresponding rheological properties.

In the case of basecoats with metallic effect pigments, the problem described previously, i.e. ensuring adequate stability with a typical film build of about 18 µm, is particularly prominent. Silver metallic is a particularly critical color in this respect.

The term "rheological properties" is understood to mean that, on the one hand the paint has such low viscosity in the spraying process, i.e. at high shear rates, that it can be atomized easily and, on the other hand when it strikes the substrate, i.e. at low shear rates, it has such a high viscosity that it is sufficiently stable and does not create sags. The higher the layer thickness is to be, the greater the problem of combining these contradictory properties. The creation of a distinctive metallic effect is associated with these properties.

This basic problem is probably also the reason why a large number of publications are concerned with specially formulated binder systems or with special additives for waterborne basecoats.

Special additives are described (EP-0 281 936) to improve rheological properties and to create a better metallic effect. These are special coating silicates which contain substantial quantities of alkali or alkaline earth ions. These ions often result in poor condensation water resistance in the total automobile finish system because of their hygroscopic effect.

So the paint manufacturers take pains to avoid such additives if possible and to use as binders those polymers which naturally incorporate the desired properties, the so-called "tailor-made" polymers.

Among the most important representatives of this type are crosslinked polymer microparticles present in an aqueous dispersion, called "microgels" for short. The addition of microgels not only brings about an improvement in rheological properties but also has a considerable influence on the stability of the paint to be applied, the alignment of the effect pigments and the adhesion of the basecoat to the primer-surfacer underneath. Thus they have a decisive effect on the stone chip resistance of the multilayer coating. However, it must be pointed out that not all the aforementioned properties are influenced positively by the addition of microgels:

Special microgels are known from EP 0 030 439 B1 and EP 0 242 235 A1. The aqueous microgel dispersions described there as beneficial for metallic finishes are not completely crosslinked microgels but belong to what are known as the "core/shell" microgels.

The term "core/shell structure" is understood to mean that the polymer particle is built up essentially of two different zones: the inner zone (core) is surrounded by an outer zone (shell), where these zones have a different chemical composition and, as a result, different physical properties as well.

The core of this microgel can be obtained from a mixture which contains difunctional monomers in addition to monofunctional monomers. The crosslinking takes place through the use of an emulgator. This crosslinked microparticle in accordance with EP 0 030 439 B1 is subsequently coated with a layer of non-crosslinked acrylic polymers and grafted. According to EP 0 242 235 A1, the crosslinked microparticle is coated with a layer of polymerizable aromatic compounds.

It is further described in EP 0 030 439 A1 to react the microgels present in an aqueous dispersion into a non-aqueous phase and to use them for coating compositions containing solvents.

From EP 0 038 127 B1, EP 0 029 637 A1 and GB 2 159 161 A microgels are known which are obtained through polymerization of suitable monomers in the presence of an emulgator, for example N,N-bis(hydroxyethyl)taurine.

The term "emulgator" is understood to mean those compounds which have both a hydrophilic and a hydrophobic residue. Emulgators bring about a stabilization of emulsions, i.e. of dispersed systems of two non-miscible or only partially miscible fluids or phases, one of which is finely dispersed in the other. A broader definition of such compounds is given, for example, in Römpp's *Chemical Lexicon* (vol. 2, $8^{th}$ edition, 1981, pp. 1126-1127). Generally, a distinction is made between ionic, non-ionic and amphoteric emulgators. For color-imparting coating compositions, emulgators are used which have a group originating from sulphonic acid as the hydrophilic residue and a longer-chain fatty alkyl residue as the hydrophobic residue.

A serious drawback to the microgels produced with the use of an emulgator is that the emulgator remains in the finished microgel; the latter can be used only with considerable disadvantages for a large number of applications, for example because of the sulfur-containing groups (sulphonic acid groups) present in the emulgator. Because of the emulgator these microgels contain, they have disadvantageous properties, for example with respect to their use in waterborne basecoats in the automobile industry, specifically with regard to water storage and condensation water resistance.

Microgels are further known from DE 36 06 513 C2 which are produced initially from a polyester component and a partially capped isocyanate component in an organic solvent. Then the organic solvent is distilled off and a reaction of solvent to a dispersion in water is carried out.

The disadvantage of the microgels obtained in this way is that when they are used in coating compositions, reproducible results cannot be obtained with regard to solids concentration and level of properties, which precludes any industrial use.

Furthermore, polymers are also described in DE 41 22 266 A1 which can be used to produce basecoats and adhesives. The resultant polymer particles are film-forming and not crosslinked to a sufficient degree where they could satisfy the requirements specified by the automobile industry with respect to aluminum flake orientation and stability.

Film-forming compositions are further known from U.S. Pat. No. 6,462,139 B1 which are used to produce clearcoats and basecoats. The polymer microparticles disclosed there are reacted afterwards with a cross-linker which contains either blocked isocyanate groups or an aminoplast resin. With the microgels described here it is necessary to carry out a dispersion step using microfluidizer, since stable dispersion in water cannot be achieved otherwise.

EP 0 502 934 also describes a microgel dispersion. It is used both to improve rheological properties and to increase the gassing stability of water-based metallic basecoats. The production of this microgel dispersion is carried out produced by single-stage aqueous phase polycondensation of a polyester polyol with an aminoplast resin (melamine resin).

The use of this microgel in basecoats when painting automobile bodies has the disadvantage that the adhesion between the basecoat and a clearcoat applied over it consisting of a powder clearcoat or a powder clearcoat slurry does not meet the requirements set out by the automobile industry.

Microgels are additionally known from DE 195 04 015 A1 which are produced by polymerization of an ethylenically monofunctional compound (polyacrylate) with at least one ethylenically di- or polyfunctional compound in the presence of a polyester. The polyester acts as an emulgator and stabilizer.

These microgels have the disadvantage that the rheological properties of these paints no longer meet the increased requirements of the automobile industry. This is shown particularly clearly with respect to the requirements for viscosity on the one hand and stability on the other.

So it is not possible, using these microgels, to prepare a water-based basecoat which has a maximum viscosity of 120 mPa·s at a shear rate of 1,000 s$^{-1}$ and is stable enough that the necessary coating thicknesses of 20-30 µm (depending on the particular color also less or more) can be attained without sags.

Furthermore, microgels are known in WO 00/63265 and WO 00/63266 which can be obtained from a multi-stage polymerization process, in which polymerization of ethylenically monofunctional compounds with ethylenically di- or multi-functional compounds is carried out in a first step in the presence of a polyester polyol, polyurethane and/or polyacrylate. As a final step, the product obtained in this way is reacted with a cross-linker. This completely crosslinked microgel is then added to binder formulations which necessarily contain a cross-linkable binder. In the formation of the final paint film, for example under baking conditions, the binder is then crosslinked—the microgel added to the binder formulation cannot participate in this crosslinking due to missing functionalities.

A problem in the use of these subsequently crosslinked microgels is that waterborne basecoats containing these microgels do not demonstrate sufficient adhesion on plastic substrates to allow them to be applied directly to a plastic surface, an automobile bumper for example, without an intermediate or adhesion primer coat.

The object of the present invention is to prepare a water-reducible microgel which can be used in waterborne basecoats, specifically for the automobile industry. The multilayer coating obtainable therefrom shall overcome the drawbacks of the prior art described previously, in particular the color coat shall have adequate adhesion on plastic substrates and the overall property level of the final multilayer coating shall satisfy the strict requirements of the automobile manufacturers (particularly with respect to appearance and stone chip resistance).

Beyond that, this microgel shall be compatible in particular with polyurethane and polyacrylate-based binder systems and result in particularly high-quality coatings.

This object is achieved in accordance with the invention by an emulgator-free microgel dispersion, obtainable by intermolecular or intramolecular crosslinking in an aqueous medium of a prepolymer, in which the prepolymer possesses at least two capped NCO groups;

at least three groups with at least one active hydrogen atom bonded to a nitrogen atom;

at least one segment in the backbone of the prepolymer originating from a triol, polyol, linear and/or branched polyester polyol; and at least one group capable of forming anions and where in the intermolecular or intramolecular crosslinking the nitrogen atoms carrying at least one active hydrogen atom react with the blocked NCO groups while forming urea compounds and releasing the blocking agent.

This object is also achieved by an emulgator-free microgel dispersion, obtainable by intermolecular or intramolecular crosslinking in an aqueous medium of a prepolymer, in which the prepolymer possesses

- at least three capped NCO groups;
- at least two groups with at least one active hydrogen atom bonded to a nitrogen atom;
- at least one segment in the backbone of the prepolymer originating from a triol, polyol, linear and/or branched polyester polyol; and
- at least one group capable of forming anions and where in the intermolecular or intramolecular crosslinking the nitrogen atoms carrying at least one active hydrogen atom react with the blocked NCO groups while forming urea compounds and releasing the blocking agent.

The microgel dispersions in accordance with the invention are aqueous; they endow coating compositions containing these emulgator-free microgel dispersions with increased structural viscosity so that adequate stability during application is achieved, where the originating coating compositions can be cured both chemically and physically.

Within the scope of the present invention, the property "aqueous" means that the dispersions under the invention contain no or only minor amounts of organic solvents. Minor amounts are those amounts which do not destroy the aqueous nature of the dispersions under the invention.

The property "structurally viscous" means that coating compositions which contain this emulgator-free microgel dispersion have a viscosity at higher shear stresses or a higher shear rate gradient which is lower than at smaller values (c.f. Römpp, *Encyclopedia of Paints and Printers Inks*, Georg Thieme Verlag, Stuttgart, N.Y., 1998, page 546, "Structural viscosity").

This structural viscosity is time-independent. Time-independence means that, depending on shear rate, the viscosity curve is identical with both increasing shear rate and with decreasing shear rate.

This structural viscosity behavior takes account of the needs of the spraying application on the one hand and of the requirements concerning storage and settling stability on the other:

In a moving state, for example when a coating composition which contains the microgels under the invention is being pumped around the circulation line of the paint facility and when being sprayed, the coating composition takes on a low viscosity state which ensures good sprayability. Without any shear stress, viscosity increases and in this way ensures that the coating composition already on the substrate surface exhibits a reduced tendency to sag on vertical surfaces ("curtaining"). In the same way, the higher viscosity in the immobile state, such as during storage, largely prevents any settling of any solid components present, such as pigments, or ensures that the solid components which have not settled much during storage can be remixed.

Within the scope of the present invention the term "physical curing" means the curing of a layer of coating material by film formation through the release of solvents from the coating material, where the linking within the coating takes place through chaining of the polymer molecules of the film-forming components or of the binders (for this term see Römpp's *Encyclopedia of Paints and Printing Inks*, Georg Thieme Verlag, Stuttgart, N.Y., 1998, "Binders" pages 73 and 74), but not with the microgels in accordance with the invention. Or the film formation takes place through the coalescence of binder particles (for this term see Römpp's, *Encyclopedia of Paints and Printing Inks*, Georg Thieme Verlag, Stuttgart, N.Y., 1998, "Curing" pages 274 and 275). Cross-linking agents are not normally required for this. If necessary, the physical curing can be promoted by heat or by the effects of actinic radiation.

In contrast, the term "chemical curing" means the curing of one layer in a coating material through a chemical reaction (see "Curing of Plastics" in Römpp's *Encyclopedia of Chemistry*, $8^{th}$ edition, 1983, pp. 1602 f).

Chemical curing is normally achieved by atmospheric oxygen or by crosslinking agents.

In the case of the polyester polyol used for the present invention, it is a compound which can be obtained from the polycondensation of at least one of the diols or polyols described previously with at least one polycarboxylic acid or its anhydride. Examples of suitable polycarboxylic acids are aromatic, aliphatic and cycloaliphatic polycarboxylic acids. Aromatic and/or aliphatic polycarboxylic acids are therefore preferably used.

Examples of suitable aromatic polycarboxylic acids are phthalic acid, isophthalic acid, terephthalic acid monosulfonate, trimellitic acid monosulfonate, phthalic acid monosulfonate, or terphthalic acid monosulfonate, of which isophthalic acid and trimellitic acid anhydride are advantageous and are therefore preferably used.

Examples of suitable acyclic, aliphatic or non-saturated polycarbonic acids are oxalic acid, malonic acid, succinic acid, glutaric acid, adipic acid, pimelic acid, suberic acid, azelaic acid, sebacic acid, undecanedioic dicarboxylic acid, dodecane dicarboxylic acid or dimer fatty acids or maleic acid, fumaric acid or itaconic acid of which adipic acid, glutaric acid, azelaic acid, sebacic acid, dimer fatty acids and maleic acid are advantageous and are therefore preferably used.

Examples of suitable cycloaliphatic and cyclic polycarboxylic acids are 1,2-cyclobutane dicarboxylic acid, 1,3-cyclobutane dicarboxylic acid, 1,2-cyclopentane dicarboxylic acid, 1,3-cyclopentane dicarboxylic acid, hexahydrophthalic acid, 1,3-cyclohexane dicarboxylic acid, 1,4-cyclohexane dicarboxylic acid, 4-methylhexahydrophthalic acid, tricyclodecane dicarboxylic acid, tetrahydrophthalic acid or 4-methyltetrahydrophthalic acid. These dicarboxylic acids can be used both in their cis- and in their trans-form and as a mixture of both forms.

The derivatives of the above listed polycarboxylic acids capable of ester reaction are also suitable, as for example, their single- or multivalent esters with aliphatic alcohols with 1 to 4 carbon atoms or hydroxyl alcohols with 1 to 4 carbon atoms. In addition, the anhydrides of the above named polycarboxylic acids can also be used, where they exist.

If necessary, monocarboxylic acids can also be used together with the polycarboxylic acids, for example, benzoic acid, tertiary buytlbenzoic acid, lauric acid, isononanoic acid, fatty acids, naturally occurring oils, acrylic acid, methacrylic acid, ethacrylic acid or crotonic acid. Isononanoic acid is preferably used as the monocarboxylic acid.

Usually triols are used together with the diols in minor quantities to induce branching in the polyester polyols.

1,6-hexanediol and neopentylglycol are particularly advantageous as diols and are therefore particularly preferably used.

Further examples of suitable polyols are polyester diols which are obtained by reaction of a lactone with a diol. They are remarkable by the presence of terminal hydroxyl groups and recurring polyester fractions of the formula —(—CO—$(CHR)_m$—$CH_2$—O—)—. Here the index m is preferably 4 to 6 and the substituent R=hydrogen, an alkyl, cycloalkyl or alkoxy residue. No substituent contains more than 12 carbon atoms. The total number of carbon atoms in the substituent does not exceed 12 per lactone ring. Examples of this are hydroxycapric acid, hydroxybutyric acid, hydroxydecanoic acid and/or hydroxystearic acid.

Unsubstituted ε-caprolactam, in which m has the value 4 and all R substituents are hydrogens, is preferred for the production of the polyester diols. The reaction with lactone is started through low-molecular polyols such as ethylene glycol, 1,3-propane diol, 1,3-butane diol or dimethylcyclohexane. Other reaction components, such as ethylene diamine, alkyldialkanolamine or even urea with caprolactam can be reacted. Polylactyl diols which are produced by reaction with ε-caprolactam, for example, with low-molecular diols are suitable as higher-molecular diols.

Further examples of suitable polyols are polyether polyols, specifically with a number-average molecular weight of 400 to 5,000, specifically from 400 to 3,000. Highly suitable polyether polyols are, for example, polyether diols of the general formula H—(—O—(CHR)$_o$—)$_p$OH, where the substituent R=hydrogen or a lower, necessarily subsituted alkyl residue, the index o=2 to 6, preferably 3 to 4, and the index p=2 to 100, preferably 5 to 50. Linear or branched polyether diols such as poly(oxyethylene)glycols, poly(oxypropylene)glycols and poly(oxybutylene)glycols are mentioned as particularly well suited examples.

The polyether diols should not introduce excessive quantities of ether groups on the one hand because otherwise the polyurethanes formed and to be used in accordance with the invention swell in water. On the other hand, they can be used in quantities which ensure the non-ionic stabilization of the polyurethanes.

Additional examples of suitable polyols are poly(meth)acrylate diols, polycarbonate diols or polyolefin diols such as POLYTAIL® from the Mitsubishi Chemical Group.

The description "at least one group capable of forming anions" refers to such groups and/or segments which can be reacted into anions in an aqueous environment by neutralizing agents. By selecting the type and the quantity of such groups, the acid number of the polymer and through it the acid number of the originating microgel can be adjusted.

Examples of suitable functional groups which can be reacted into anions are carboxylic acid, sulphonic acid or phosphonic acid groups, in particular carboxylic. acid groups.

In particular the functional groups which can be reacted into anions originate from compounds, dihydroxy-propionic acid, dihydroxy-succinic acid, dihydroxy-benzoic acid, dihydroxy-cyclohexane monocarboxylic acid and 2,2 dialkylalkane acids with the formula

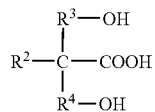

in which R$^2$ represents a hydrogen atom or an alkyl group with up to 20 carbon atoms, R$^3$ and R$^4$ independently of each other represent linear or branched alkylene groups with 1 to 6 carbon atoms, preferably —CH2—. Examples of such compounds are 2,2-dimethylacetic acid, 2,2-dimethylolpropionic acid, 2,2-dimethylolbutyric acid and 2,2-dimethylolpentane acid. The preferred dihydroxyl alkane acids are 2,2-dimethylolpropionic acid and 2,2-dihydroxystearic acid.

Examples of suitable neutralizing agents for functional groups capable of being reacted to anions are ammonia or amines, such as trimethylamine, triethylamine, tributylamine, dimethylaniline, diethylaniline, triphenylamine, dimethylethanolamine, diethylethanolamine, methyldiethanolamine, 2-aminomethylpropanol, dimethylisopropylamine, dimethylisopropanolamine or triethanolamine. Dimethylethanolamine and/or triethylamine are preferably used as neutralizing agents.

The term "neutralization" is understood to mean that—relative to the neutralization agent used—a theoretically calculated degree of neutralization of at least 50% is set.

The degree of neutralization NG to be determined theoretically can be calculated according to the following formula:

$$NG(\text{in \%}) = \frac{M \text{ Neutralizing agent (in } g) * 5.610.000}{\begin{array}{c} SN \text{ of solid resin to be neutralized} * \\ M \text{ of solid resin to be neutralized (in } g) * \\ MGW \text{ of the neutralizing agent} \end{array}}$$

The term "polyisocyanate" is understood here and in what follows to mean a compound which has at least two NCO groups. Consequently, diisocyanates fall under this definition.

The description "active hydrogen atom" is understood here and in what follows to mean those hydrogen atoms which react with non-capped NCO groups under normal reaction conditions in polyurethane chemistry while forming urethane or urea bonds.

Consequently, in the case of the at least one active hydrogen atom bonded to a nitrogen atom, it is a hydrogen atom originating from an NH group and/or an NH$_2$ group.

Whenever an active hydrogen atom of this type is not bonded to a nitrogen atom, it originates preferably from an OH group.

The capped NCO groups necessary for at least one of the initial compounds can be obtained by reacting corresponding free NCO groups with the usual capping or blocking agents known in polyurethane chemistry.

With the crosslinking in accordance with the invention, it can be ascertained that the capping agent is released under reaction conditions. Similarly, the formation of crosslinked particles can be observed unambiguously.

IR-spectroscopic urea bonds can furthermore be shown to be present in the reaction product, selective proof is possible specifically by means of nuclear magnetic resonance spectroscopic methods.

Regarding detailed production of polyurethanes, their final products and the techniques and processes for their modification, such as for example chain elongation, crosslinking, reference is made to the literature: D. Dieterich "Aqueous Emulsions, Dispersions and Solutions of Polyurethanes; Synthesis and Properties" in *Progress in Organic Coatings*, 9, (1981), pp. 281-340; *Ullmann's Encyclopedia of Industrial Chemistry*, 5$^{th}$ edition, volume 21, pp. 665-716 and M. J. Husbands et al. *A Manual of Resins for Surface Coatings*, (1987) SITA Technology, London, vol. 3, pp. 1-59.

The particular advantage to the emulgator-free microgels under the invention in accordance with the embodiments described previously is that adding them to waterborne coating compositions has a clear and positive effect on special properties.

Basically it can be ascertained that the rheological properties of the waterborne coating compositions obtainable through the use of these emulgator-free and phosphonic acid-modified microgel dispersions are improved compared with those of the prior art. For example, a waterborne basecoat which can be used in the automobile industry, with just the addition of 20% of the emulgator-free microgel dispersion under the invention—relative to the solids content of the coating composition—shows a viscosity of at most 100 mpa·s at a shear rate of 1,000 s$^{-1}$, where the dry film thickness of the cured basecoat measures 22 μm without any sagging being observed.

The emulgator-free and phosphonic acid-modified microgel under the invention is especially suitable in the production and formulation of waterborne basecoats, in particular for those used in the automobile industry.

In addition, the emulgator-free and phosphonic acid-modified microgel dispersion under the invention gives the color-imparting coating composition outstanding adhesion on plastic substrates.

This property deserves special emphasis since this paint can be used in an unchanged formulation for metal, pretreated substrates (automobile bodies) as well as for plastic add-on parts for automobiles (e.g. bumpers). This prevents color deviation. Until now it has often been necessary for the area of industrial applications, starting with waterborne basecoats for the production painting of automobile bodies, to increase their adhesion for plastic substrates by the addition of specific "adhesion promoters" or even through additional adhesion coats.

The outstanding adhesion of the basecoats containing the microgel under the invention can be seen from the "steam jet test," which is the established test in the automobile industry for adequate adhesion.

Furthermore through the addition of the emulgator-free and phosphonic acid-modified microgel dispersion under the invention to color-imparting coating compositions the overall property level of the final multilayer coating is not negatively affected. The final multilayer coating shows excellent properties with respect to mechanical (stone chip resistance) and visual criteria (i.e. orientation of the effect pigments).

It can be further ascertained that the emulgator-free and phosphonic acid-modified microgel dispersions under the invention has excellent application properties with binder systems based on polyurethane, polyacrylate or mixtures of polyurethanes and polyacrylates. This good applicability is seen particularly from the good adhesion properties of the originating paint film on plastic substrates. Coating compositions combining polyurethane and/or polyacrylate based binder systems and the emulgator-free microgel dispersion under the invention produce extremely high-quality coatings.

In accordance with a particular embodiment of the present invention, more than 70% of the groups with at least one active hydrogen atom bonded to a nitrogen atom are reacted while forming polyurea bonds.

All the embodiments described previously under the invention have in common that the microgels occurring in dispersion are for the most part crosslinked.

The degree of crosslinking of the microgels can be seen from the content of insoluble ingredients. The insolube ingredients are determined by the "THF" method. For this about 1 g of the microgel dispersion is weighed into a centrifuge tube, 10 ml of tetrahydrofuran is added and it is homogenized for about 1 minute in an ultrasound bath. Then it is centrifuged at 13,500 rpm for 15 minutes using a centrifuge with a fixed-angle rotor. Subsequently the excess is carefully decanted and the tube is dried in a laboratory oven for 6 hours at 105° C. After the tube has cooled, the residue is reweighed. The insoluble ingredients are calculated using the formula below:

$$\% \text{ insoluble ingredients} = \frac{\text{residue} * 10000}{\text{weighed quantity} * \% \text{ solid content of the microgel dispersion}}$$

The term "crosslinked for the most part" refers to those microgels which have a percentage of non-crosslinked polymers of not more than 30% by weight relative to the crosslinked part.

With respect to the core/shell microgel in accordance with the invention, this means that the crosslinked core is described as "crosslinked for the most part" if it contains not more than 30% by weight of non-crosslinked components.

In accordance with a preferred embodiment of the present invention, the group is an NH$_2$ group, with at least one active hydrogen atom bonded to a nitrogen atom.

Diamines and polyamines can be mentioned as compounds with at least one NH$_2$ group, in particular those with 1 to 40 carbon atoms, preferably about 2 to 15 carbon atoms. They may carry substituents which do not have any hydrogen atoms that can react with isocyanate groups.

Diamines are hydrazine, ethylene diamine, propylene diamine, 1,4 butylene diamine, piperazine, 1,4-cyclohexyldimethylamine, hexamethylene diamine-1,6, trimethylhexamethylenediamine, methanediamine, isophorondiamine, 4,4'-diaminodicyclohexylmethane and aminoethylethanolamine. Preferred diamines are hydrazine, alkyl or cycloalkyl-diamines such as propylenediamine and 1-amino-3-aminomethyl-3,5,5-trimethylcyclohexane. Hydrazine and adipinic acid bishydrazide are particularly preferred.

Polyamines are understood to be those compounds which have two or three primary and/or secondary amino groups. Examples of suitable polyamines are essentially alkylene polyamines. Examples are polyamines with a linear or branched aliphatic, cycloaliphatic or aromatic structure and at least two primary amino groups. Examples of polyamines are:

Alklylene polyamines with 1 to 40 carbon atoms, preferably with about 2 to 15 carbon atoms, with a linear or branched aliphatic, cycloaliphatic or aromatic structure and at least two primary amino groups, which if necessary have substituents which do not have hydrogen atoms capable of reacting with isocyanate groups.

In accordance with a similarly preferred embodiment of the present invention, the polymer has
  a number-average molecular weight of more than 2,000;
  an acid number between 10 and 30 mg KOH/g;
  at least one segment originating from a diisocyanate as the hard segment.

From what is known from the prior art, the number-average molecular weight has a considerable effect on the rheology of the coating composition containing the emulgator-free microgel dispersion in accordance with the invention.

Very generally, a higher number-average molecular weight causes an increase in the crosslinking points within the microgel (i.e. the mesh width of the polymer is increased).

What is important here is that even with a high number-average molecular weight, adequate stability is ensured for the dispersion with an adequate degree of neutralization for stabilization in water.

In accordance with a preferred embodiment of the invention the triol has 3 to 24 carbon atoms.

Triols are: glycerin, 1,2,4,-, 1,3,5-trihydroxycyclohexane, trimethylolethane, 1,2,4-butane triol, 1,2,6-hexane triol and trimethylol propane.

Trimethylol propane is preferred.

In accordance with a similarly preferred embodiment of the present invention, the polyol has 3 to 12 carbon atoms.

Polyols are pentaerythite, di-pentaerythrite, and hydroxylated epoxydated linseed or soyabean oils.

Di-trimethylolpropane is preferred.

Higher functionality for the pre-polymer is ensured in particular through the use of triols or polyols, so that increased crosslinking is achieved, which is revealed in improved rheological properties for the coating compositions containing these microgel dispersions.

In accordance with a further, equally preferred embodiment of the present invention, the linear and/or branched polyester polyol can be obtained from polycondensation of a polycarboxylic acid with at least one diol or polyol.

Diols which can be used for this are ethylene glycol, 1,2- or 1,3-propanediol, 1,2-, 1,3- or 1,4-butane diol, 1,2-, 1,3-, 1,4- or 1,5-pentane diol, 1,2-, 1,3-, 1,4-, 1,5- or 1,6-hexane diol, hydroxypivalic acid neopentyl ester, neopentylglycol, diethylene glycol, 1,2-, 1,3-, or 1,4-cyclohexane diol, 1,2-, 1,3-, or 1,4-cyclohexane dimethanol, trimethylpentanediol, ethylbutylpropanediol, the position-isomeric diethyloctane diols, 2-butyl-2-ethylpropanediol-1,3, 2-butyl-2-methylpropanediol-1,3, 2-phenyl-2-methyl propanediol-1,3, 2-propyl-2-ethylpropanediol-1,3, 2-di-tertiary butyl propanediol-1,3, 2-butyl-2-propylpropanediol-1,3, 1-dihydroxymethyl-bi-cyclo[2.2.1]heptane, 2,2-diethylpropanediol-1,3, 2,2-dipropylpropanediol-1,3, 2-cyclohexyl-2-methylpropanediol-1,3, 2,5-dimethyl-hexanediol-2,5, 2,5-diethyl-hexanediol-2,5, 2-ethyl-5-methylhexanediol-2,5, 2,4-dimethyl pentanediol-2,4, 2,3-dimethyl butanediol-2,3, 1,4(2'-dydroxypropyl)-benzene, 1,3(2'-hydroxypropyl)-benzene, trimethylolpropanemonoallylether or dimerdiol (Unichema).

The compounds described above can be selected as a diol or polycarboxylic acid.

In accordance with a further, similarly preferred embodiment of the present invention, the linear or branched polyester polyol has a number-average molecular weight between 300 and 4000 and a hydroxyl number between 28 and 580.

By selecting a suitable low-molecular polyol and a long-chain, linear and/or branched polyester polyol, high crosslinking density is achieved, where the distance between the respective crosslinking centers is sufficiently large that rheological properties are influenced positively.

It is also possible to use a polyether polyol in place of a polyester polyol.

The capped NCO groups, the same or different, originate from the reaction with a compound which results in turn from the reaction of a polyisocyanate with a suitable capping agent. The term "blocking agent" is synonymous with the term "capping agent."

All compounds which can be used in the production of waterborne basecoats are suitable as polyisocyanates. Examples of these polyisocyanates are aliphatic diisocyanates such as 1,1-methylenebis(4-isocyanate cyclohexane) (4,4'-dicyclohexylmethanediisocyanate, Desmodur W), hexamethylene diisocyante (HMDI, 1,6-hexanediisocyanate, Desmodur H), isophorondiisocyanate (IPDI, 3,5,5-trimethyl-1-isocyanate-3-isocya namethylcyclohexane), 1,4-cyclohexyldiisocyanate (CHDI, trans, -trans-1,4-diisocyanatecyclohexane);

aromatic triisocyantes such as tris(4-isocyanatophenyl) methane (Desmodur R), 1,3,5-tris(3-isocyanate-4-methylphenyl)-2,4,6-trioxohexahydro-1,3,5-triazine (Desmodur IL); adducts of aromatic diisocyanates such as the adduct of 2,4-toluene diisocyante (TDI, 2,4-toluylen diisocyanate) and trimethylol propane (Desmodur L); and/or aliphatic triisocyantes such as N-isocyanatohexylaminocarbonyl-N,N'-bis(isocyanatehexyl)urea (Desmodur N), 2,4,6-trioxo-1,3,5-tris(6-isocyanatehexyl)-hexahydro-1,3,5-triazine (Desmodur N3300), 2,4,6-trioxo-1,3,5-tris(5-isocyanate-1,3,3-trimethylcyclohexylmethyl) hexahydro-1,3,5-triazine (Desmodur Z4370).

Particularly good results are achieved from the reaction of a diisocyanate such as 1,1-methylenebis(4-isocyanate cyclohexane) (4,4'-dicyclohexyl methane diisocyante, Desmodur W), hexamethylene diisocyante (HMDI, 1,6-hexane diisocyanate, Desmodur H), isophorondiisocyanate (IPDI, 3,5,5-trimethyl-1-isocyanate-3-isocyanamethyl cyclohexane), 1,4-cyclohexyl diisocyanate (CHDI, trans, trans-1,4-diisocyanate cyclohexane) with a capping agent, specifically with methylethylketoxime.

Quite especially preferred is the use of TMXDI (m-tetramethylxylylene diisocyante) which introduces the blocked NCO groups after reaction with a blocking agent.

The term "capping agent" is understood to mean those compounds which react with the NCO groups of a polyisocyanate in a way such that the polyisocyanate blocked in this way at room temperature is resistant to hydroxyl groups. At elevated temperatures, normally in the range of about 90 to 300° C., the capped polyisocyanate reacts by splitting off the capping agent.

Any number of suitable aliphatic, cycloaliphatic or aromatic alkyl monoalcohols can be used to cap (or block) the polyisocyanates. Examples are aliphatic alcohols, such as methyl alcohol, ethyl alcohol, chlorethyl alcohol, propyl alcohol, butyl alcohol, amyl alcohol, hexyl alcohol, heptyl alcohol, octyl alcohol, nonyl alcohol, 3,3,5-trimethylhexyl alcohol, decyl alcohol and lauryl alcohol; aromatic alkyl alcohols such as phenylcarbinol and methylphenylcarbinol. Small amounts of higher-molecular and relatively difficult to volatilize monoalcohols can be used, when these alcohols act as softeners in the coatings after they have split off.

Other suitable capping agents are oximes, such as methylethylketonoxime, acetone oxime and cyclohexanone oxime as well as caprolactams, phenols and hydroxyformic acid esters. Preferred capping agents are malonic esters, acetic acid esters and β-diketones.

The capped polyiscyanates are produced by reacting the capping agent in sufficient volume with the organic polyisocyanate so that there are no more free isocyanate groups.

Examples of suitable blocking agents are a) phenols such as phenol, cresol, xylenol, nitrophenol, chlorophenol, ethyl phenol, tertiary butyl phenol, hydroxy benzoic acid, esters of this acid or 2,5-di-tertiary butyl-4-hydroxy toluene;

b) lactams such as "caprolactam," valerolactam, butyrolactam or β-propiolactam;

c) active methylenic compounds, such as diethyl malonate, dimethyl malonate, acetic acid ethyl or -methylester or acetylacetone;

d) alcohols such as methanol, ethanol, n-propanol, isopropanol, n-butanol, isobutanol, t-butanol, n-amylalcohol, t-amylalcohol, lauryl alcohol, ethylene glycolmonomethylether, ethylene glycolmonoethylether, ethylene glycol monobutylether, diethyleneglycolmonomethylether, diethyleneglycolmonoethylether, propyleneglycolmonomethylether, methbxymethanol, glycol acid, glycol acid ester, lactic acid, lactic acid ester, methylol urea, methylolmelamine, diacetonealcohol, ethylene chlorohydrin, ethylene bromohydrin, 1,3-dichloro-2-propanol, 1.4-cyclohexyldimethanol, acetocyanohydrin or furanmethanol;

e) mercaptans such as butylmercaptan, hexylmercaptan, t-butylmercaptan, t-dodecylmercaptan, 2-mercaptan benzothiazole, thiophenol, methylthiophenol, or ethylthiophenol;

f) acid amides such as acetoanilide, acetoanisidinamide, acrlyamide, methacrylamide, acetic amide, stearic acid amide or benzamide;

g) imides such as succinimide, phthalimide or maleimide;

h) amines such as diphenylamine, phenylnaphthylamine, xylidine, N-phenylxylidine, carbazol, aniline, napthylamine, butylamine, dibutylamine, diisopropylamine or butylphenylamine;

i) imidazoles such as imidazole or 2-ethyl imidazole;

j) ureas such as urea, thiourea, ethylene urea, ethylene thiourea or 1,3-diphenyl urea;

k) carbamates such as N-phenylcarbamate acid phenylester or 2-oxazolidon;

l) imines such as ethylene imine;

m) oximes such as acetoneoxime, formaldoxime, acetaldoxime, acetoxime, methylethylketoxime, diisobutylketoxime, diacetylmonoxime, benzophenoxime or chlorohexanoxime;

n) salts of sulfuric acids such as sodium bisulphate or potassium bisulphate;

o) hydroxic acid esters such as benzylmethacrylatehydroxamate (BMH) or allylmethacrylichydroxamate; or p) substituted pyrazoles, in particular dimethylpyrazole or triazole; and q) mixtures of these blocking agents, specifically dimethylpyrazole und triazoles, malonic ester and acetic acid ester or dimethylpyrazol and succinimide.

Methylethylketoxime is especially preferred in the sense of the present invention as a blocking agent.

In order to counter the risk of gelling, the polyisocyanates described above can be partially blocked.

This is understood to mean the reaction of the polyisocyanate when a blocking agent is deficient. However, the entire polyisocyanate is not partially blocked as a result. The mixture obtainable in this way from partially blocked polyisocyanate and remaining, non-blocked isocyanate is then reacted subsequently with the other components into the emulgator-free microgel dispersion.

In addition to the embodiments described previously, the microgel can have other structural units or segments in its backbone which originate from the conventional initial components used in paint chemistry.

For example, polymer A and/or B can contain polyurethane segments which originate from the compounds described previously having non-blocked polyisocyanates and hydroxyl groups (for example, diols, polyester polyols, polyethers).

Similarly preferred is an embodiment of the present invention in which the group capable of forming anions originates from dimethylpropionic acid, 9,10-dihydroxystearic acid and/or from a polyester polyol with at least one group capable of forming anions.

These specially selected compounds endow the dispersion with clearly improved stability.

The group from a polyester polyol capable of forming anions can have at least one free carboxyl group on average per molecule, said group originating particularly from trimellitic acid, trimellitic acid anhydride, dimethyl propionic acid or dihydroxy stearic acid.

In this way the determining functionality for the stability of the dispersion is introduced through an additional compound so that the risk of gelling during the production of the pre-polymer is prevented, and at the same time increased functionality for the pre-polymer building blocks is achieved.

The group capable of forming anions can also originate from a diamine or polyamine.

The result of this is that the backbone can contain additional functional groups which allow stronger crosslinking without negatively affecting the stability of the dispersion. The reason is that with increasing functionality of the prepolymer, the risk of premature gelling is increased. The introduction of the group capable of forming anions through the chain-extending agent allows the group that is critical for the stability of the dispersion to be brought in at a time when crosslinking of the prepolymer is not expected.

It is also possible that the compound with at least one group capable of forming anions has still more functional groups, as is the case, for example, with amino group-containing compounds. In this connection $\alpha,\delta$-diaminovaleric acid, 3,4-diaminobenzoic acid, 2,4-diamino toluene-sulphonic acid-(5) and 4,4'-diaminodiphenylether sulphonic acid must be mentioned as examples. These compounds allow the group capable of forming anions to be introduced and at the same time have an active hydrogen atom bonded to a nitrogen atom which reacts with the blocked NCO group of polymer A while releasing the blocking agent and forming a urea compound.

To the extent that the risk of gelling during production of the initial polymers should be reduced, those emulgator-free microgel dispersions are preferred in which the group capable of forming anions originates exclusively from the diamine or polyamine.

Naturally, additional influences known to the person skilled in the art (quantity and type of the solvent, the nature of the building blocks for the backbone and their influence on molecular weight distribution) have a not inconsiderable influence on the risk of gelling.

The group capable of forming anions can also originate exclusively from the diamine or polyamine, and it is advantageous that this group capable of forming anions is a sulphonic acid group.

Diamino alkylsulphonic acid compounds must be mentioned in this connection as preferred compounds.

It is particularly preferred if at most one group capable of forming anions is present per 8,000 average mol weight units.

As a result, the rheological properties of the coating compositions containing the emulgator-free microgel dispersion in accordance with the invention can be improved even further.

In addition, a further embodiment of the present invention is preferred in which the number-average molecular weight of the prepolymer is a maximum of 10,000, preferably between 3,000 and 7,000.

This achieves an optimal range for an adequately high degree of crosslinking with a simultaneously sufficiently large mesh width.

From what is known from the prior art, the number-average molecular weight has a considerable effect on the rheology of the coating composition containing the emulgator-free microgel dispersion in accordance with the invention.

Very generally, a higher number-average molecular weight causes in increase in the crosslinking points within the microgel (i.e. the mesh width of the polymer is increased).

What is important here is that even with a high number-average molecular weight, adequate stability is ensured for the dispersion with an adequate degree of neutralization for stabilization in water. Even with a 100%-degree of neutralization, microgels can be obtained.

In accordance with a further embodiment of the present invention, the crosslinking is carried out in the presence of an additional polymer with an OH number between 30 and 400 and an acid number between 1 and 150, where the polymer is selected from the group of polyacrylates, polyesters and polyurethanes.

With this embodiment in accordance with the invention, the hydroxyl-group containing polymer can participate in the crosslinking to form a microgel.

To the extent that this polymer is water-reducible, this polymer is dispersed in water after solution polymerization by following intrinsicallly known steps. Otherwise, a pre-mixture is created from the polymer which is not reducible in water together with polymer A, which is not yet dispersed in water, said pre-mixture then undergoing dispersal in water.

This polymer can be added in a quantity between 5 and 30% by weight, relative to the solids content of the total coating composition.

The appropriate acid number of the additional polymer is achieved by incorporating a group capable of forming anions in a known way.

This embodiment results in an additional improvement in stability and alignment of the effect pigments.

In addition, the adhesion of the coating composition containing the emulgator-free microgel dispersion in accordance with the invention is increased.

Suitable polyacrylates can be obtained by solvent polymerization of monomers containing hydroxyl groups and alkyl (meth)acrylates, and also (meth)acrylic acid, styrene and/or ethylenically unsaturated monomers as required.

Suitable monomers containing hydroxyl groups are described in detail in what follows.

All monomers with at least one polymerizable double bond can be used as ethylenically unsaturated monomers, as described in detail in what follows.

Solvents not containing hydroxyl groups are used as solvents for this solution polymerization, ketones, such as methylethyl ketone, methylisobutyl ketone or methylamyl ketone are especially preferred.

Suitable polyesters containing hydroxyl groups are those listed in the following description of the polyester polyols.

Suitable polyurethanes can be obtained from the reaction of at least one diol, polyol, polyether and/or a polyester polyol with at least one polyisocyanate in the sense of the present invention.

In a further similarly preferred embodiment of the present invention, the crosslinking is carried out along with emulsion polymerization using at least one monomer compound which contains at least one radically polymerizable double bond, and at least one monomer compound containing hydroxyl groups which contains at least one radically polymerizable double bond.

The microgels produced therefrom in dispersion exhibit a wide-meshed crosslinking density. A particular advantage of such an emulgator-free microgel dispersion lies in still further improved orientation of the effect pigments, increased adhesion and improved stability.

The rheological properties of the coating composition containing the emulgator-free microgel dispersion in accordance with the invention can thereby be improved even further.

In this embodiment, the monomer compound containing the hydroxyl group, or the emulsion polymeride linked through this monomer compound containing the hydroxyl group, can participate in the crosslinking to the microgel. The microgels produced in this way do not exhibit a core/shell structure.

Monomers with at least one radically polymerizable double bond which have no hydroxyl group are for example vinyl aromatic compounds, such as vinyl toluenes, α-methyl styrene, p-, m- or p-methyl styrene, 2,5-dimethyl styrene, p-methoxy styrene, p-tertiary butyl styrene, p-dimethylamino styrene, p-acetamide styrene and m-vinyl phenol, particularly preferred styrene;

esters of acrylic or methacrylic acid, such as methyl(meth)acrylate, ethyl(meth)acrylate, butyl(meth)acrylate, iso-butyl(meth)acrylate, tertiary butyl(meth)acrylate, iso-propyl(meth)acrylate, pentyl(meth)acrylate, isoamyl (meth)acrylate, hexyl(meth)acrylate, α-ethyl(meth) acrylate, furfuryl(meth)acrylate, octyl(meth)acrylate, 3,5,5-trimethylhexyl(meth)acrylate, decyl(meth)acrylate, lauryl(meth)acrylate, hexadecyl(meth)acrylate, octadecyl(meth)acrylate, stearyl(meth)acrylate and ethyl triglycol(meth)acrylate; cyclohexyl(meth)acrylate, isobornyl(meth)acrylate;

acrylic acid, methacrylic acid, ethacrylic acid, crotonic acid, maleic acid, fumaric acid or itaconic acid;

aminoethylacrylate, aminoethylmethacrylate, allylamine, n-methyliminoethylacrylate or tertiary butyl aminoethylmethacrylate;

N,N-di(methoxymethyl) aminoethylacrylate or -methacrylate or N,N-di(butoxymethyl) aminopropylacrylate or -methacrylate;

(meth)acrylic acid amides such as (meth)acrylic acid amide, N-methyl-, N-methylol-, N,N-dimethylol-, N-methoxymethyl-, N,N-di(methoxymethyl)-, N-ethoxymethyl- and/or N,N-di(ethoxyethyl)-(meth) acrylic acid amide;

acryloyloxy- or methacryloloxyethyl-, propyl carbamate or butyl carbamate or -allophanate; other examples of suitable monomers that contain carbamate groups are described in U.S. Pat. Nos. 3,479,328, 3,674,838, 4,126, 747, 4,279,833 or 4,340,497;

Monomers containing epoxide groups, such the glycidylester of acrylic acid, methacrylic acid, ethacrylic acid, crotonic acid, maleic acid, fumaric acid or itaconic acid or allylglycidylether.

The following must be mentioned as monomer compounds containg hydroxyl groups with at least one radically polymerizable double bond:

hydroxyalkyl esters of acrylic acid, methacrylic acid or another α,β-olefinically unsaturated carbonic acid which originate from an alkylene glycol which is estered with the acid, or which are obtainable through reaction of the α,β-olefinically unsaturated carbonic acid with an alkylene oxide such as ethylene oxide or propylene oxide, in particular hydroxyl alkylesters of acrylic acid, methacrylic acid, ethacrylic acid, crotonic acid, maleic acid, fumaric acid or itaconic acid in which the hydroxylalkyl group contains up to 20 carbon atoms, such as for example, 2-hydroxyethylacrylate, 2-hydroxypropylacrylate, 3-hydroxypropylacrylate, 3-hydroxybutylacrylate, 4-hydroxybutylacrylate, 4-hydroxyl(meth) acrylate, 4-hydroxethacrylate, 4-hydroxycrotonate, 4-hydroxy-maleinate, 4-hydroxyfumarate or 4-hydroxyitaconate; or hydroxycycloalkyl esters such as 1,4-bis(hydroxymethyl)cyclohexaneacrylate, octahydro-4, 7-methano-1-H-inden-dimethanolacrylate or methylpropanediol monoacrylate, methylpropanediol monomethacrylate, methylpropanediol monoethylacrylate, methylpropanediol monocrotanate, methyipropanediol monomaleinate, methylpropanediol monfumarate or methylpropanediol monoiticonate;

reaction products from cyclic esters, such as for example, caprolactam and the hydroxyalkylesters described previously or hydroxycycloalkylesters (obtainable for example under the name Tone® M 100 from DOW Chemicals);

unsaturated polyols such as trimethylolpropanmonoether or -diallylether or pentaerythritemono-, -di- or -triallylether;

reaction products from acrylic acid and/or methacrylic acid with the glycidyl ester of a monocarbonic acid branched in α-position with 5 to 18 c-atoms per molecule, in particular of a versatic® acid, or in place of the reaction product an equivalent volume of acrylic and/or methacrylic acid which is then reacted during or after the polymerization reaction with the glycidyl ester of a monocarbonic acid branched in α-position with 5 to 18 c-atoms per molecule, in particular of a versatic® acid.

In a further preferred embodiment of the present invention, the emulgator-free microgel dispersion is characterized in that the reaction mixture originating from the crosslinking then undergoes emulsion polymerization of at least one monomer compound which contains at least one radically polymerizable double bond.

This monomer compound with at least one radically polymerizable double bond particularly preferably contains hydroxyl groups.

An emulgator-free microgel of this type present in dispersion occurs in a core/shell structure. The inner zone is completely crosslinked, in accordance with the definition given previously. The outer zone of this core/shell microgel is not crosslinked. When a monomer compound with at least one radically polymerizable double bond is used, crosslinking of the outer shell place does not take place until baking conditions exist for the production of corresponding multilayer coating.

Partial crosslinking in the finished paint through the outer shell is ensured only if a monomer compound containing hydroxyl groups with at least one radically polymerizable double bond is used.

In accordance with this embodiment, the polymerized monomer mixture does not participate in the crosslinking to the microgel.

Furthermore, a coating composition containing this emulgator-free microgel dispersion demonstrates such outstanding adhesion that it can be used even in multilayer coating considered critical in the production painting of automobiles, specifically in conjunction with powder clearcoats.

In accordance with a preferred embodiment, only those monomers with at least one radically polymerizable double bond not containing hydroxyl groups are used in the described previously core-shell polymers, or microgels described previously. Surprisingly, the use of a monomer compound without hydroxyl groups reinforces this positive adhesion property even further.

An emulgator-free microgel of this type present in dispersion occurs in a core/shell structure. The inner zone is completely crosslinked, in accordance with the definition given previously. The outer zone of this core/shell microgel is similarly not crosslinked. In contrast to the core/shell polymer described previously, no crosslinking of the outer shell place can take place under baking conditions for the production of corresponding multilayer coating.

In accordance with this embodiment, this ensures that the emulsion polymerization cannot participate in the crosslinking during film formation. Outstanding adhesion to plastic substrate is thereby achieved, even in conjunction with powder clearcoats.

Higher-function monomers of the type described previously are generally used in corresponding quantities. Within the scope of the present invention, appropriate quantities of higher-function monomers is understood to mean those quantities that result in the crosslinking but not in the gelling of the microgel dispersion.

The orientation of the effect pigments in aqueous metallic basecoats is clearly improved when emulgator-free microgel dispersions in accordance with this embodiment are used.

The object is also achieved in accordance with the invention through an emulgator-free microgel dispersion, obtainable by crosslinking a polymer A dispersed in an aqueous medium and a polymer B, where polymer A has at least two blocked NCO groups;
polymer B has at least three groups with at least one active hydrogen atom bonded to a nitrogen atom, and where polymer A and/or polymer B has/have
at least one segment in the backbone originating from a diol, polyol, polyether and/or a polyester polyol; and
at least one group capable of forming anions and where during the crosslinking the nitrogen atoms carrying at least one active hydrogen atom react with the blocked NCO groups while forming urea compounds and releasing the blocking agent.

This object is similarly achieved through an emulgator-free microgel dispersion, obtainable by crosslinking a polymer A dispersed in an aqueous medium and a polymer B, where polymer A has at least three blocked NCO groups;
polymer B has at least two groups with at least one active hydrogen atom bonded to a nitrogen atom, and where polymer A and/or polymer B has/have
at least one segment in the backbone originating from a diol, polyol, polyether and/or a polyester polyol; and
at least one group capable of forming anions and where during the crosslinking the nitrogen atoms carrying at least one active hydrogen atom react with the blocked NCO groups while forming urea compounds and releasing the blocking agent.

To the same degree, this object is likewise achieved through an emulgator-free microgel dispersion, obtainable by crosslinking a polymer A dispersed in an aqueous medium and a polyamine, where polymer A has at least two blocked NCO groups;
the polyamine has at least three groups with at least one active hydrogen atom bonded to a nitrogen atom, and where polymer A has
at least one segment in the backbone originating from a diol polyol, polyether and/or a polyester polyol; and
at least one group capable of forming anions and where during the crosslinking the nitrogen atoms carrying at least one active hydrogen atom react with the blocked NCO groups while forming urea compounds and releasing the blocking agent.

To the same degree, this object is likewise achieved through an emulgator-free microgel dispersion, obtainable by crosslinking a polymer A dispersed in an aqueous medium and a polyamine, where polymer A has at least three blocked NCO groups;
the polyamine has at least two groups with at least one active hydrogen atom bonded to a nitrogen atom, and where the polymer has
   at least one segment in the backbone originating from a diol, polyol, polyether and/or a polyester polyol; and
   at least one group capable of forming anions and where during the crosslinking the nitrogen atoms carrying at least one active hydrogen atom react with the blocked NCO groups while forming urea compounds and releasing the blocking agent.

The number-average molecular weight of polymer A and/or of polymer B in one of the previously named embodiments of the invention is 10,000 at the most, preferably between 2,000 and 8,000.

In accordance with a preferred embodiment of the present invention, the chain of polymer A, which additionally contains two non-blocked NCO groups, is extended with a diamine and/or polyamine prior to crosslinking with polymer B (or with the polyamine).

One of the advantages is that stability can be improved further.

Polyamines are compounds which have two or more primary and/or secondary amino groups. Examples of polyamines are:

hydrazine, ethylene diamine, propylene diamine, 1,4-butylene diamine, piperazine, 1,4-cyclohexyldimethylamine, hexamethylene diamine-1,6, trimethylhexamethylene diamine, isophoron diamine, 1-amino-3-aminomethyl-3,5,5-trimethylcyclohexane, 4,4'diamine dicyclohexylmethane and aminoethylethanolamine; and alkylene polyamines with 1 to 40 carbon atoms, preferably with about 2 to 15 carbon atoms, with linear or branched aliphatic, cycloaliphatic or aromatic structure and at least two primary amino groups which have if necessary substituents which do not have any isocyanate groups capable of reacting with water.

The polyamines preferably used are 2-methyldiamine pentane, ethylene diamine, N,N-diethylene triamine, adipinic acid bishydrazide and hydrazine. Adipinic acid bishydrazide and hydrazine are quite particularly preferred.

Similarly preferred is an embodiment of the present invention in which the diamine or polyamine has at least one group capable of forming anions. The result of this is that the backbone can contain additional functional groups from the polymer and/or polymers which allow stronger crosslinking without negatively affecting the stability of the dispersion. As the functionality of the pre-polymer increases, the danger of premature gelling grows. The introduction of the group capable of forming anions through the chain extending agent allows the insertion of the group that is critical to the stability of the dispersion at a time when crosslinking of the pre-polymer is not expected.

If the danger of gelling is to be prevented, those emulgator-free microgel dispersions are preferred in which the group capable of forming anions originates exclusively from the diamine or polyamine.

Naturally, other influences familiar to the person skilled in the art (quantity and type of solvent, nature of the backbone's building blocks and their influence on the distribution of molecular weight) have a not inconsiderable effect on the danger of gelling.

Inasmuch as the group capable of forming anions originates exclusively from the diamine or polyamine, it is advantageous that this anion-forming group is a sulphonic acid group.

It is particularly preferred if at most one group capable of forming anions is present per 8,000 average mole weight units.

The rheological properties of the coating composition containing the emulgator-free microgel dispersion in accordance with the invention can thereby be improved still further.

The underlying object of the present application is also achieved through an emulgator-free microgel dispersion which is obtainable by crosslinking a polymer dispersed in an aqueous medium with a blocked isocyanate where
   the capped isocyanate is not dispersible in water and has at least two blocked NCO groups;
   the polymer has at least three groups with at least one active hydrogen atom bonded to a nitrogen atom
   and where the polymer has
      at least one segment in the backbone originating from a diol, polyol, polyether and/or a polyesterpolyol; and
      at least one group capable of forming anions and where during the crosslinking the nitrogen atoms carrying at least one active hydrogen atom react with the blocked NCO groups while forming urea compounds and releasing the blocking agent.

In the same way, the object is achieved through an emulgator-free microgel dispersion, obtainable by crosslinking a polymer dispersed in an aqueous medium with a blocked isocyanate, where
   the capped isocyanate is not dispersible in water and has at least three blocked NCO groups;
   the polymer has at least two groups with at least one active hydrogen atom bonded to a nitrogen atom and where the polymer has
   at least one segment in the backbone originating from a diol, polyol, polyether and/or a polyesterpolyol; and
   at least one group capable of forming anions and where during the crosslinking the nitrogen atoms carrying at least one active hydrogen atom react with the blocked NCO groups while forming urea compounds and releasing the blocking agent.

In accordance with a further embodiment of the present invention, the crosslinking is carried out in the presence of an additional polymer C with an OH number between 30 and 400 and an acid number between 1 and 150, where polymer C is selected from the group of polyacrylates, polyesters and polyurethanes.

In this embodiment of the invention, the polymer containing hydroxyl groups can participate in the crosslinking to the microgel.

The corresponding acid number of the additional polymer (C) is achieved by incorporating a group capable of forming anions in a known way.

This embodiment results in a still further improvement in stability and alignment of the effect pigments.

In addition, adhesion of the coating composition containing the emulgator-free microgel dispersion in accordance with the invention is increased.

Suitable polyacrylates can be obtained by solution polymerization of monomers containing hydroxyl groups and alkyl(meth)acrylates, and (meth)acrylic acid, styrene and/or ethylenically unsaturated monomers as required.

Suitable monomers containing hydroxyl groups are described in detail in what follows.

All monomers with at least one polymerizable double bond can be used as ethylenically unsaturated monomers, as described in detail in what follows.

Solvents not containing hydroxyl groups are used as solvents for this solution polymerization, ketones are particularly preferred, such as for example, methylethyl ketone, methylisobutyl ketone or methyamyl ketone.

Suitable polyesters containing hydroxyl groups are those listed under the following description of the polyester polyols.

Suitable polyurethanes can be obtained from the reaction of at least one diol, polyol, polyether and/or a polyester polyol with a least one polyisocyanate in the sense of the present invention.

The corresponding acid number of the polyurethane is achieved by incorporating in a known way a group capable of forming anions.

In accordance with this embodiment, the adhesion of the coating composition containing the emulgator-free microgel dispersion in accordance with the invention is clearly increased.

This polymer C can be added in a quantity between 5 and 30% by weight relative to the solids content of the entire coating composition.

In a further, similarly preferred embodiment of the present invention, the crosslinking is carried out along with an emulsion polymerization of at least one monomer compound containing hydroxyl groups, where the monomer compound containing hydroxyl groups contains at least one polymerizable double bond.

A particular advantage of such an emulgator-free microgel dispersion lies in further improved orientation of the effect pigments, increased adhesion and improved stability.

The rheological properties of the coating composition containing the emulgator-free microgel dispersion in accordance with the invention can thereby be improved still further.

In this embodiment, the monomer compound containing hydroxyl groups, or the emulsion polymeride linked through this monomer compound containing hydroxyl groups, can participate in the crosslinking to the microgel. The microgels produced in this way do not exhibit a core-shell structure.

The previously named compounds must be mentioned as monomer compounds containing hydroxyl groups with at least one polymerizable double bond.

Monomers selected from the group of 2-hydroxypropylmethacrylate, 4-hydroxybutylacrylate and Tone® M 100 from DOW Chemicals are particularly preferred.

The rheological properties of the coating composition containing the emulgator-free microgel dispersion in accordance with the invention can thereby be improved still further.

In a further preferred embodiment of the present invention, the emulgator-free microgel dispersion is characterized in that the reaction mixture originating from the crosslinking subsequently undergoes emulsion polymerization of at least one monomer compound which contains at least one radically polymerizable double bond.

It is particularly preferable for this monomer compound with at least one radically polymerizable double bond to contain hydroxyl groups.

In accordance with this embodiment, this monomer compound does not participate in the crosslinking to the microgel. This has a positive effect on adhesion to plastic substrates.

An emulgator-free microgel of this type present in dispersion also occurs in a core/shell structure.

Partial crosslinking in the finished paint through the external shell is ensured only if a monomer compound containing hydroxyl groups with at least one radically polymerizable double bond is used.

The adhesion properties of the coating composition containing the emulgator-free microgel dispersion in accordance with the invention can be improved still further through the use of the monomer compound with at least one radically polymerizable double bond described previously.

The use of a monomer compound without hydroxyl groups reinforces this positive adhesion property more.

It must be noted that in addition to the acrylate monomers containing hydroxyl groups described previously, monomers which do not contain hydroxyl groups can also be used.

Consequently, emulsion polymerization is carried out in the presence of at least one additional monomer compound without hydroxyl groups, which contains at least one radically polymerizable double bond.

Mixtures of monomers containing hydroxyl groups and those without hydroxyl groups are particularly preferred.

Monomers with at least one radically polymerizable double bond which do not contain hydroxyl groups are the compounds already mentioned.

Especially preferred are monomers selected from the group of esters of acrylic or methacrylic acid, and styrene.

Higher-function monomers of the type described previously are generally used in appropriate quantities. Within the scope of the present invention, appropriate quantities of higher-function monomers is understood to mean those quantities that result in the crosslinking but not in the gelling of the microgel dispersion.

Such mixtures of monomer building blocks with and without hydroxyl groups demonstrate outstanding properties with respect to adhesion on plastic substrates without additional primer or adhesion promoter coats.

The orientation of the effect pigments in aqueous metallic basecoats is clearly improved when emulgator-free microgel dispersions in accordance with this embodiment are used.

This reaction does not possess any unique features from a methodological point of view, but follows the traditional and familiar methods of radical emulsion polymerization in the presence of at least one polymerization initiator.

Examples of suitable polymerization initiators are initiators forming free radicals, such as dialkyl peroxides, such as di-tertiary butyl peroxide or dicumyl peroxide; hydroperoxides such as cumolhydroperoxide or tertiary butyl hydroperoxide; peresters, such as tertiary butyl perbenzoate, tertiary butyl perpivalate, tertiary butylper-3,5,5-trimethyl-hexanoate or tertiary butylper-2-ethylhexanoate; potassium, sodium or ammonium peroxodisulfate; azodnitriles such as azobisisobutyronitrile; C—C splitting initiators such as benzpinacol silylether; or a combination of a non-oxidizing initiator with hydrogen peroxide. Water-insoluble intitiators are preferably used. The initiators are preferably used at a volume of 0.1 to 25% by weight, particularly preferred of 0.75 to 10% by weight, relative to the total weight of the monomers (a).

The initiation of polymerization through a redox system has proved to be particularly advantageous. This well-known procedure in emulsion polymerization engineering exploits the fact that hydroperoxides are stimulated to radical decay at very low temperatures by suitable reduction agents.

Suitable reduction agents are, for example, sodium metabisulfite or its formaldehyde precipitation product (Na-hydroxymethanesulfinate). Isoascorbic acid is also very well suited. The combination of tertiary butylhydroperoxide (iso) ascorbic acid and iron(ll)sulfate is particularly advantageous.

The use of this mixture has the advantage that the polymerization can be started at room temperature.

The corresponding monomers are polymerized in the solutions or the aqueous emulsions with the aid of the previously named radical-forming initiators at temperatures of 30 to 95° C., preferably 40 to 95° C., and, when redox systems are used, at temperatures of 35 to 90° C. In the case of operations under positive pressure, the emulsion polymerization can be carried out even at temperataures above 100° C.

The same applies to solution polymerization when higher-boiling organic solvents and/or positive pressure is used.

It is preferred that the initiator feed is started some time, generally about 1 to 15 minutes, before the monomer feed. Further, a process is preferred in which addition of the initiator begins at the same time as addition of the monomers and ends about a half hour after the addition of the monomers has ended. The initiator is preferably added at a constant volume per unit of time. After the addition of the initiator is concluded, the reaction mixture is maintained at polymerization temperature long enough (generally 1 to 1½ hours) for all the monomers being used to have been essentially completely reacted. "Essentially completely reacted" is intended to mean that preferably 100% by weight of the monomers used has been reacted, but that it is still possible that a small residual monomer content, at most up to 0.5% by weight relative to the weight of the reaction mixture, can remain unreacted.

The customary and known agitator vessels, agitator vessel cascades, tubular flow reactors, loop reactors or Taylor reactors, as described in patent DE 10 71 241 B1, patent applications EP 0 498 583 A1 or DE 198 28 742 A1 or in the article by K. Kataoka in *Chemical Engineering Science*, vol. 50, number 9, 1995, pages 1409 to 1416, can be considered as reactors for graft polymerization.

In accordance with a similarly preferred embodiment of the present invention, polymer A and/or polymer B has/have
a number-average molecular weight of more than 800;
an acid number between 10 and 70 mg KOH/g;

From what is known from the prior art, the number-average molecular weight has a considerable effect on the rheology of the coating composition containing the emulgator-free microgel dispersion in accordance with the invention.

Very generally, a higher number-average molecular weight causes an increase in the crosslinking points within the microgel (i.e. the mesh width of the polymer is increased).

What is important here is that even with a high number-average molecular weight, adequate stability is ensured for the dispersion with an adequate degree of neutralization for stabilization in water.

The diol, or polyol, which can found as a corresponding segment in the backbone of polymer A and/or B, is, in the sense of the present invention, preferably a diol and/or polyol with 2 to 36 carbon atoms, which is preferably selected from the group of trimethylolpropane monoallylether, di-trimethylolpropane and hydroxylated fatty acid compounds.

Through the use of polyols, i.e. of compounds with more than three OH groups, higher functionality of the pre-polymer is ensured here as well, so that increased crosslinking is achieved, which can be seen in improved rheological properties for the coating composition containing these microgel dispersions.

In the case of the polyester polyol used for the present invention, it is a compound which can be obtained from polycondensation of at least one diol and/or polyol with at least one polycarboxylic acid or its anhydride.

Examples of suitable polycarboxylic acids are aromatic, aliphatic and cycloaliphatic polycarboxylic acids. Aromatic and/or aliphatic polycarboxylic acids are preferred.

Examples of suitable aromatic polycarboxylic acids are phthalic acid, isophthalic acid, terephthalic acid, trimellitic acid, phthalic acid, isophthalic acid or terephthalic acid monosulfonate, or halogenated phthalic acids, such as tetrachlor- or tetrabromphthalic acid, of which isophthalic acid and trimellitic acid anhydride are advantageous and therefore preferably used.

Examples of suitable acyclic aliphatic or unsaturated polycarboxylic acids are oxalic acid, malonic acid, succinic acid, glutaric acid, adipic acid, pimelic acid, suberic acid, azelaic acid, sebacic acid, undecandicarbonic acid, dodecandicarbonic acid or dimer fatty acids or maleic acid, fumaric acid or itaconic acid of which adipic acid, glutaric acid, azelaic acid, sebacic acid, dimer fatty acids and maleic acid are advantageous and are therefore preferably used.

Examples of suitable cycloaliphatic and cyclic polycarboxylic acids are 1,2-cyclobutane dicarboxylic acid, 1,3-cyclobutane dicarboxylic acid, 1,2-cyclopentane dicarboxylic acid, 1,3-cyclopentane dicarboxylic acid, hexahydrophthalic acid, 1,3-cyclohexane dicarboxylic acid, 1,4-cyclohexane dicarboxylic acid, 4-methylhexahydrophthalic acid, tricyclodecane dicarboxylic acid, tetrahydrophthalic acid, or 4-methyltetrahydrophthalic acid. These dicarboxylic acids can be used both in their cis- and in their trans-form or as a mixture of both forms.

The derivates of the above named polycarboxylic acids capable of ester reaction are also suitable, as for example their single- and multi-valent esters with aliphatic alcohols with 1 to 4 c-atoms or hydroxyalcohols with 1 to 4 c-atoms. The anhydrides of the previously named polycarboxylic acids can additionally be used, where they exist.

If necessary, monocarboxylic acids can be used along with the polycarboxylic acids, as for example, benzoic acid, tertiary butyl benzoic acid, lauric acid, isononanic acid, fatty acids of naturally occurring oils, acrylic acid, methacrylic acid, ethacrylic acid or crotonic acid. Isononanic acid is used preferably as the monocarboxylic acid.

Examples of suitable polyols are diols and triols, in particular diols. Normally triols are used in smaller quantities together with the diols in order to initiate branchings in the polyester polyols.

Examples of suitable diols are ethylene glycol, 1,2- or 1,3-propane diol, 1,2-, 1,3- or 1,4-butane diol, 1,2-, 1,3-, 1,4- or 1,5-pentane diol, 1,2-, 1,3-, 1,4-, 1,5- or 1,6 hexanediol, hydroxy pivalic acid neopentyl ester, neopentylglycol, diethyleneglycol, 1,2-, 1,3- or 1,4-cyclohexane diol, 1,2-, 1,3- or 1,4-cyclohexanedimethanol, trimethylpentane diol, ethylbutylpropane diol, the position-isomeric diethyloctane diols, 2-Butyl-2-ethylpropane diol-1,3, 2-Butyl-2-methylpropane diol-1,3, 2-phenyl-2-methylpropane diol-1,3, 2-propyl-2-ethylpropane diol-1,3, 2-di-tertiary butylpropane diol-1,3, 2-butyl-2-propylpropane diol-1,3, 1-dihydroxy-bi-cyclo [2.2.1]heptane, 2,2-diethylpropane diol-1,3, 2,2-dipropylpropane diol-1,3, 2-cyclohexyl-2-methylpropane diol-1,3, 2,5-dimethyl-hexane diol-2,5, 2,5-diethyl-hexane diol-2,5, 2-ethyl-5-methylhexane diol-2,5, 2,4-dimethyl pentane diol-2,4, 2,3-dimethyl butane diol-2,3, 1,4(2'-hydroxypropyl)-benzene, 1,3(2'-hydroxypropyl)-benzene. Of these diols 1,6-hexane diol and neopentyl glycol are particularly advantageous and therefore particularly preferably used.

Higher-function polyols can also be used, such as trimethylolpropane, glycerin, pentaerythrite, di-trimethylolpropane and di-pentaerythrite.

Further examples of suitable polyols are polyesterdiols which are obtained by reaction of a lactone with a diol. They are remarkable by the presence of terminal hydroxyl groups and recurrent polyester fractions of the formula —(—CO—(CHR)$_m$—CH$_2$—O—)—. Here the index m is preferably 4 to 6 and the substituent R=hydrogen, an alkyl, cycloalkyl or alkoxy residue. No substituent contains more than 12 carbon atoms. The total number of carbon atoms in the substituent does not exceed 12 per lactone ring. Examples of this are hydroxycapric acid, hydroxybutyric acid, hydroxydecane acid and/or hydroxystearic acid.

Unsubstituted ε-caprolactam, in which m has the value 4 and all R substituents are hydrogens is preferred for the production of the polyester diols. The reaction with lactone is started through low-molecular polyols such as ethylene glycol, 1,3-propane diol, 1,4-butane diol or dimethylcyclohexane. Other reaction components, such as ethylene diamin, alkyldialkanolamine or even urea with caprolactam can be reacted. Polylactame diols which are produced through reaction with ε-caprolactam, for example, with low-molecular diols are suitable as higher-molecular diols.

Further examples of suitable polyols are polyether polyols, specifically with a number-average molecular weight of 400 to 5,000, specifically from 400 to 3,000. Highly suitable polyether polyols are, for example, polyether diols of the general formula H—(—O—(CHR)$_o$—)$_p$OH, where the substituent R=hydrogen or a lower, necessarily subsituted alkyl residue, the index o=2 to 6, preferably 3 to 4, and the index p=2 to 100, preferably 5 to 50. Linear or branched polyether diols such as poly(oxyethylene)glycols, poly(oxypropylene) glycols and poly(oxybutylene)glycols are mentioned as particularly well suited examples.

The polyether diols should not introduce excessive quantities of ether groups on the one hand because otherwise the polyurethanes formed and to be used in accordance with the invention swell in water. On the other hand, they can be used in quantities which ensure the non-ionic stabilization of the polyurethanes. They then act as the functional non-ionic groups (a3) described in what follows.

Additional examples of suitable polyols are poly(meth) acrylate diols, polycarbonate diols or polyolefin diols such as POLYTAIL® from the Mitsubishi Chemical Group. In a preferred embodiment, the polyester polyol has a number-average molecular weight between 200 and 6,000, an OH number between 20 and 550 and an acid number less than 5.

Particularly good results with regard to an advantageous (for the use of the inventive emulgator-free microgels in coating compositions) suitable crosslinking are achieved if segments originating from various OH-functional compounds, i.e. from various diols, polyols, polyethers and/or a polyester polyol, are present in the backbone of polymer A and/or B.

This crosslinking then has a decisive influence both on the adhesion, the orientation of the effect pigments, the stability and on the rheology of the coating composition containing the emulgator-free microgel dispersion in accordance with the invention.

For example, by selecting a suitable low-molecular polyol and a long-chain, linear polyester polyol, a high crosslinking density is achieved, in which the interval between the respective crosslinking centers is sufficiently large. Without this interval, the rheological properties and the adhesion of a coating composition containing the emulgator-free microgel dispersion in accordance with the invention would not otherwise be ensured in this instance.

In a particularly preferred embodiment of the present invention, the group capable of forming anions comes from dimethylolpropionic acid and/or 9,10-dihydroxystearic acid.

These specially selected compounds provide clearly improved stability to the dispersion.

In accordance with a further, similarly preferred embodiment of the present invention, the group capable of forming anions originates from a polyester polyol which has at least one free carboxyl group on average per molecule originating from trimellithic acid, trimellithic acid anhydride, dimethylpropionic acid or di-hydroxystearic acid.

Here too, the functionality crucial to the stability of the dispersion is introduced through an additional compound, so that the danger of gelling during the production of the pre-polymer is prevented, and at the same time increased functionality is achieved for the pre-polymer building blocks.

Emulgator-free microgel dispersion from one of the preceding claims, wherein at least one of the groups with at least one active hydrogen atom of the polymer bonded to a nitrogen atom originates from a di- or polyamine, in particular from 2-methyldiaminopentane, ethylediamine, N,N-diethylentriamine, adipinic acid bishydrazide or hydrazine segment.

Hydrazine and adipinic acid bishydrazide are particularly preferred for use as polyamines in the sense of the present invention.

Adducts of the reaction of the polyamines described previously with one or more monomers with at least one vinyl double bond through Michael addition can also be used.

Suitable monomers with at least one vinyl double bond are esters of acrylic or methacrylic acid, such as methyl(meth) acrylate, ethyl(meth)acrylate, butyl(meth)-acrylate, iso-butyl (meth)acrylate, tertiary butyl(meth)acrylate, isopropyl(meth) acrylate, pentyl(meth)acrylate, isoamyl(meth)acrylate, hexyl (meth)acrylate, α-ethylhexyl(meth)acrylate, furfuryl(meth) acrylate, octyl(meth)acrylate, 3,5,5-trimethylhexyl(meth) acrylate, decyl(meth)acrylate, lauryl(meth)acrylate, hexadecyl(meth)acrylate, octadecyl(meth)acrylate, stearyl (meth)acrylate and ethyltriglycol(meth)acrylate; cyclohexyl (meth)acrylate, isobornyl(meth)acrylate.

The capped NCO groups, the same or different, come from the reaction with a compound which in turn results from the reaction of a polyisocyanate with a suitable capping agent. The term "blocking agent" is synonymous with the term "capping agent."

All compounds which can be used in the production of waterborne basecoats are suitable as polyisocyanates. The previously mentioned isocyanate compounds can be named as examples of such polyisocyanates.

Particularly good results are achieved with 1,1-methylenebis(4-isocyanate cyclohexane) (4,4'-dicyclohexyl methane diisocyante, Desmodur W), hexamethylene diisocyante (HMDI, 1,6-hexane diisocyanate, Desmodur H), isophoron diisocyanate (IPDI, 3,5,5-trimethyl-1-isocyanate-3-isocyanamethyl cyclohexane), 1,4-cyclohexyl diisocyanate (CHDI, trans, trans-1,4diisocyanato cyclohexane), N-isocyanato-hexylaminocarbonyl-N,N'-bis(isocyanatohexyl)urea (Desmodur N), 2,4,6-trioxo-1,3,5-tris(6-isocyanatohexyl)-hexahydro-1,3,5-triazine (Desmodur N3330), 2,4,6-trioxo-1, 3,5-tris(5-isocyanato-1,3,3-trimethylcyclohexylmethyl) hexdyro-1,3,5-triazine (Desmodur Z4370).

Quite especially preferred is the use of TMXDI (m-tetramethylxylylene diisocyante) which introduces the capped NCO groups after reaction with a capping agent.

The term "capping agent" is understood to mean those compounds which react with the NCO groups of a polyisocyanate in a way that the polyisocyanate capped in this way is resistant to hydroxyl groups at room temperature. At elevated temperatures, normally in the range of about 90 to 300° C., the capped polyisocyanate reacts by splitting off the blocking agent.

Any number of suitable aliphatic, cycloaliphatic or aromatic alkyl monoalcohols can be used to cap (or block) the polyisocyanates. Examples are aliphatic alcohols, such as methyl alcohol, ethyl alcohol, chlorethyl alcohol, propyl alcohol, butyl alcohol, amyl alcohol, hexyl alcohol, heptyl alcohol, octyl alcohol, nonyl alcohol, 3,3,5-trimethylhexyl alcohol, decyl alcohol and lauryl alcohol; aromatic alkyl alcohols such as phenylcarbinol and methylphenylcarbinol. Small amounts of higher-molecular and relatively difficult to volatilize monoalcohols can be used, when these alcohols act as softeners in the coatings after they have split off. Other suitable capping agents are oximes, such as methyl ethyl ketonoxime, acetone oxime and cyclohexanoneoxime as well as caprolactams, phenols and hydroxy formic acid esters. Preferred capping agents are malonic esters, acetic acid esters and β-diketones.

The capped polyiscyanates are produced by reacting the capping agent in sufficient quantity with the organic polyisocyanate so that there are no more free isocyanate groups.

The compounds already mentioned are examples of suitable blocking agents. Methylethylketoxime is particularly preferred in the sense of the embodiment of the present invention as a capping agent.

In order to counter the risk of gelling, the polyisocyanates described above can be partially blocked.

This is understood to mean the reaction of the polyisocyanate with a deficient capping agent.

In addition to the embodiments described previously, the microgel can have other structural units or segments in its backbone which originate from the customary initial components used in paint chemistry.

For example, polymer A and/or B can contain polyurethane segments which originate from the compounds having non-blocked polyisocyanates and hydroxyl groups described previously (for example, diols, polyester polyols, polyether).

The object is similarly achieved in accordance with the invention through an emulgator-free and acrylate-modified microgel dispersion, obtainable by emulsion polymerization of at least one monomer compound (A) containing hydroxyl groups, which contains at least one radically polymerizable double bond, in the presence of an aqueous dispersion of a polylmer (A), the latter containing
  at least two blocked NCO groups;
  at least one segment in the backbone originating from a diol, polyol, polyether and/or polyester polyol; and
  at least one group capable of forming anions where during the emulsion polymerization the hydroxyl groups of the monomer compound (A) react with the blocked NCO groups of polymer (B) while forming urea compounds and releasing the blocking agent.

Two essential reactions are principally involved in this conversion as well: first, an unblocking takes place, i.e. the blocked NCO groups are converted into free NCO groups as the blocking agent is released. These free NCO groups react with the remaining matching components containing hydroxyl groups present in the reaction mixture, in particular with the monomer compound (A) containing hydroxyl groups. On the other hand, a polymerization of the hydroxyl group-containing monomer compound (A) takes place, i.e. a polymer analogous reaction.

In accordance with a preferred embodiment of the present invention, the emulsion polymerization is carried out additionally in the presence of at least one monomer compound (C) containing hydroxyl groups, which contains at least one radically polymerizable double bond.

As a result, the crosslinking points are more scattered and are subject to statistical distribution.

Monomers (C) with at least one radically polymerizable double bond, which do not have hydroxyl groups, are the unsaturated compounds described previously.

In accordance with a further embodiment of the present invention, the crosslinking is carried out in the presence of an additional polymer (D) with an OH number between 30 and 400 and an acid number between 1 and 150, where polymer (D) is selected from the group of the polyacrylates, polyesters and polyurethanes.

In this embodiment in accordance with the invention, the polymer containing hydroxyl groups can participate in the crosslinking to the microgel.

To the extent that polymer (D) is water-reducible, polymer (D) is dispersed in water following the solution polymerization following intrinsically known steps. Otherwise, a premixture is formed from the non water-reducible polymer (D) along with the polymer (B) which has not yet been dispersed in water, and the mixture then undergoes dispersion in water.

Polymer (D) can be added in a volume between 5 and 30% by weight, relative to the solids content of the entire coating composition.

This embodiment results in a further improvement in stability and alignment of the effect pigments.

In addition, the adhesion of the coating composition containing the emulgator-free microgel dispersion in accordance with the invention is increased.

Suitable polyacrylates can be obtained by solution polymerization of monomers containing hydroxyl groups and alkyl(meth)acrylates, as well as (methyl)acrylic acid, styrene and/or ethylenically unsaturated monomers if required.

Suitable monomers containing hydroxyl groups are described in detail in what follows.

All monomers with at least one polymerizable double bond, as described in detail in what follows, can be used as ethylenically unsaturated monomers.

The appropriate acid number for the polyacrylate is achieved by incorporating a group capable of forming anions in a known way.

Suitable polyesters containing hydroxyl groups are those listed under the following description of the polyester polyols.

The appropriate acid number for the polyester is achieved by incorporating a group capable of forming anions in a known way.

Suitable polyurethanes can be obtained from the reaction of at least one diol, polyol, polyether and/or a polyester polyol with at least one polyisocyanate in the sense of the present invention.

The appropriate acid number for the polyurethane is achieved by incorporating a group capable of forming anions in a known way.

Solvents not containing hydroxyl groups are used as solvents for this solution polymerization, ketones are especially preferred, as for example, methylethylketone, methylisobutylketone or methylamylketone.

In addition, the present invention relates in a further, similarly preferred embodiment to an emulgator-free microgel dispersion, in which the reaction mixture originating from the crosslinking subsequently undergoes a further emulsion polymerization, where the monomer compound contains at least one radically polymerizable double bond.

It is particularly preferable for this monomer compound with at least one radically polymerizable double bond to contain hydroxyl groups.

The previously mentioned compounds can be named as hydroxyl-containing monomer compounds with at least one radically polymerizable double bond.

An emulgator-free microgel present in dispersion occurs in a core/shell structure. The inner zone is largely crosslinked, in accordance with the definition previously given. The outer zone of this core/shell microgel is not crosslinked. When a monomer compound with at least one radically polymerizable double bond is used, crosslinking of the outer shell does not take place until baking conditions exist for the production of corresponding multi-coat finishes.

Partial crosslinking in the finished paint through the external shell is ensured only if a monomer compound containing hydroxyl groups with at least one radically polymerizable double bond is used.

In accordance with this embodiment, the polymerized monomer compound does not participate in the crosslinking to the microgel.

Furthermore, a coating composition containing this emulgator-free microgel dispersion demonstrates such outstanding adhesion that it can be used even in multilayer coating considered critical in the production painting of automobiles, specifically in conjunction with powder clearcoats.

In the core-shell polymers, or microgels, described previously, in accordance with a preferred embodiment only those monomers with at least one radically polymerizable double bond which do not contain hydroxyl groups are used.

Surprisingly, the use of a monomer compound without hydroxyl groups reinforces this positive adhesion property still more.

An emulgator-free microgel of this sort present in dispersion occurs in a core/shell structure. The inner zone is completely crosslinked, in accordance with the definition previously given. The outer zone of this core/shell microgel is similarly not crosslinked. In contrast to the core/shell polymer described previously, no crosslinking of the outer shell place can take place under baking conditions for the production of corresponding multilayer coating.

In accordance with this embodiment, it is ensured that the emulsion polymerization cannot participate in the crosslinking during film formation. Outstanding adhesion on plastic substrates is achieved, even in conjunction with powder clearcoats.

Higher-function monomers of the type described previously are generally used in appropriate quantities. Within the scope of the present invention, appropriate quantities of higher-function monomers is understood to mean those quantities that result in the crosslinking but not in the gelling of the microgel dispersion.

The orientation of the effect pigments is clearly improved when emulgator-free microgel dispersions are used in accordance with this embodiment in water-based metallic basecoats.

This reaction does not possess any unique features from a methodological point of view, but follows the customary and familiar methods for radical emulsion polymerization in the presence of at least one polymerization initiator.

Examples of suitable polymerization initiators are the compounds mentioned previously. Water-insoluble initiators are preferably used. The initiators are preferably used in a volume of 0.1 to 25% by weight, especially preferably from 0.75 to 10% by weight, relative to the total weight of the monomers (a).

One possibility of initiating polymerization through a redox system has likewise been described in what preceded.

The use of this mixture has the advantage that the polymerization can be started at room temperature.

The corresponding monomers are polymerized in the solutions or the aqueous emulsions with the aid of the previously named radical-forming initiators at temperatures of 30 to 95° C., preferably 40 to 95° C., and when redox systems are used, at temperatures of 35 to 90° C. In the case of operations under positive pressure, the emulsion polymerization can be carried out even at temperataures above 100° C.

The same applies to solution polymerization when higher-boiling organic solvents and/or positive pressure is used.

It is preferred that the initiator feed is started some time, generally about 1 to 15 minutes, before the monomer feed.

Further, a process is preferred in which addition of the initiator begins at the same time as addition of the monomers and ends about a half hour after the addition of the monomers has ended. The initiator is preferably added at a constant volume per unit of time. After the addition of the initiator is concluded, the reaction mixture is maintained at polymerization temperature long enough (generally 1 to 1½ hours) for all the monomers being used to have been essentially completely reacted. "Essentially completely reacted" is intended to mean that preferably 100% by weight of the monomers used has been reacted, but that it is still possible that a small residual monomer content, at most up to 0.5% by weight relative to the weight of the reaction mixture, can remain unreacted.

The customary and known reactors already mentioned can be considered for the grafting polymerization.

In accordance with a similarly preferred embodiment of the present invention, polymer A has
a number-average molecular weight of more than 800;
an acid number between 20 and 150 mg KOH/g.

From what is known from the prior art, the number-average molecular weight has a considerable effect on the rheology of the coating composition containing the emulgator-free microgel dispersion in accordance with the invention.

Very generally, a higher number-average molecular weight causes an increase in the crosslinking points within the microgel (i.e. the mesh width of the polymer is increased).

What is important here is that even with a high number-average molecular weight, adequate stability is ensured for the dispersion with an adequate degree of neutralization for stabilization in water.

In accordance with a preferred embodiment of the present invention, a diol and/or polyol with 2 to 36 carbon atoms is used as the diol or polyol which can be found in the backbone of polymer (B).

The diols for this are ethylene glycol, 1,2- or 1,3-propanediol, 1,2-, 1,3- or 1,4-butanediol, 1,2-, 1,3- or 1,4- or 1,5-pentanediol, 1,2-, 1,3- or 1,4-, 1,5- or 1,6-hexanediole, hydroxy pivalinic acid neopentylester, neopentyl glycol, diethylene glycol, 1,2-, 1,3- or 1,4 cyclohexanediol, 1,2-, 1,3- or 1,4-cyclohexanedimethanol, trimethylpentanediol, ethylbutylpropanediol, the position-isomeric diethyloctandiols, 2-butyl-2-ethylpropanediol-1,3, 2-butyl-2-methylpropanediol-1,3, 2-phenyl-2-methylpropanediol-1,3, 2-propyl-2-ethylpropanediol-1,3, 2-di-tertiary butylpropanediol-1,3, 2-butyl-2-propylpropanediol-1,3, 1-dihydroxy-bi-cyclo [2.2.1]heptane, 2,2-diethylpropane diol-1,3, 2,2-dipropyl-propanediol-1,3, 2-cyclohexyl-2-methylpropanediol-1,3, 2,5-dimethyl-hexanediol-2,5, 2,5-diethyl-hexane diol-2,5, 2-ethyl-5-methylhexane diol-2,5, 2,4-dimethyl pentane diol-2,4, 2,3-dimethyl butanediol-2,3, 1,4(2'-hydroxypropyl)-benzene, 1,3(2'-hydroxypropyl)-benzene, 1,3-(2'-hydroxylpropyl)-benzene or Dimerdiol (Unichema).

The following must be mentioned as polyols, trimethylolpropane, glycerin, pentaerythrite, di-trimethylolpropane, di-pentaerythrite, and hydroxylated, epoxidized linseed or soyabean oils.

The diol or polyol is preferably selected from the group of 1,6-hexanediol and di-trimethylolpropane.

In particular through the use of polyols (i.e. of compounds with more than three OH groups), greater pre-polymer functionality is also ensured here, so that increased crosslinking is achieved, which is shown in improved rheological properties for the coating compositions containing these microgel dispersions.

The polyester polyol used for the present invention is a compound which is obtainable from the polycondensation of at least one of the diols or polyols described previously having at least one carbonic acid or its anhydride.

Examples of suitable polycarboxylic acids are aromatic, aliphatic and cycloaliphatic carboxylic acids. Preferably aromatic and/or aliphatic polycarboxylic acids are used.

Examples of suitable aromatic polycarboxylic acids are phthalic acid, isophthalic acid, terephthalic acid, trimellithic acid, phthalic acid-, isophthalic acid- or terphthalic acid monosulfonate, of which isophthalic acid and trimellithic acid anhydride are advantageous and are therefore preferably used.

Examples of suitable acyclic, aliphatic or non-saturated polycarboxylic acids are oxalic acid, malonic acid, succinic acid, glutaric acid, adipic acid, pimelic acid, suberic acid, azelaic acid, sebacic acid, undecanedioic dicarboxylic acid, dodecane dicarboxylic acid or dimer fatty acids or maleic acid, fumaric acid or itaconic acid, of which adipic acid, glutaric acid, azelaic acid, sebacic acid, dimer fatty acids are advantageous and are therefore preferably used.

Examples of suitable cycloaliphatic and cyclic polycarboxylic acids are 1,2-cyclobutane dicarboxylic acid, 1,3-cyclobutane dicarboxylic acid, 1,2-cylcopentane dicarboxylic acid, 1,3-cylcopentane dicarboxylic acid, hexahydrophthalic acid, 1,3-cylcohexane dicarboxylic acid, 1,4-cylcohexane dicarboxylic acid, 4-methylhexahydrophthalic acid, tricyclodecane dicarboxylic acid, tetrahydrophthalic acid or 4-methyltetrahydrophthalic acid. These dicarboxylic acids can be used both in their cis- and in their trans-form and as a mixture of both forms.

The derivatives of the polycarboxylic acids listed above capable of ester reaction are also suitable, for example, their single- or multivalent esters with aliphatic alcohols with 1 to 4 carbon atoms or hydroxyl alcohols with 1 to 4 carbon atoms. In addition, the anhydrides of the above named polycarboxylic acids can also be used, where they exist.

If necessary, monocarboxylic acids can also be used together with the polycarboxylic acids, for example, benzoic acid, tertiary-buytl benzoic acid, lauric acid, isononanic acid, fatty acids, naturally occurring oils, acrylic acid, methacrylic acid, ethacrylic acid or crotonic acid.

Usually triols are used together with the diols in minor quantities to induce branching in the polyester polyols.

1,6-hexanediol and neopentylglycol are particularly advantageous as diols and therefore particularly preferably used.

Further examples of suitable polyols are polyester diols which are obtained by reaction of a lactone with a diol. They are remarkable by the presence of terminal hydroxyl groups and recurring polyester ingredients with the formula —(—CO—(CHR)$_m$—CH$_2$—O—)—. Here the index m is preferably 4 to 6 and the substituent R=hydrogen, an alkyl, cycloalkyl or alkoxy residue. No substituent contains more than 12 carbon atoms. The total number of carbon atoms in the substituent does not exceed 12 per lactone ring. Examples of this are hydroxy capric acid, hydroxy butyric acid, hydroxydecane acid and/or hydroxy stearic acid.

Unsubstituted ε-caprolactam, in which m has the value 4 and all R substituents are hydrogens, is preferred for the production of the polyester diols. The reaction with lactone is started through low-molecular polyols such as ethylene glycol, 1,3-propane diol, 1,4-butane diol or dimethylolcyclohexane. Other reaction components, such as ethylene diamine, alkyldialkanolamine or even urea with caprolactam can be reacted. Polylactyl diols which are produced through reaction with ε-caprolactam, for example, with low-molecular diols, are suitable as higher-molecular diols.

Further examples of suitable polyols are the polyether polyols described previously. The polyether diols should not introduce excessive quantities of ether groups on the one hand because otherwise the polyurethanes formed and to be used in accordance with the invention swell in water. On the other hand, they can be used in quantities which ensure the non-ionic stabilization of the polyurethanes. Additional examples of suitable polyols are poly(meth)acrylate diols, polycarbonate diols or polyolefin diols such as POLYTAIL® from the Mitsubishi Chemical Group.

In accordance with a further, similarly preferred embodiment of the present invention, the polyester polyol has a number-average molecular weight between 200 and 6,000, an OH number between 20 and 550 and an acid number less than 5.

Particularly good results with regard to an advantageous (for the use of the inventive emulgator-free microgels in coating compositions) suitable crosslinking are achieved if segments originating from various OH-functional compounds i.e. from various diols, polyols, polyethers and/or a polyester polyol, are present in the backbone of polymer A and/or B.

This crosslinking then has a decisive influence both on the adhesion, the orientation of the effect pigments, the stability and on the rheology of the coating composition containing the emulgator-free microgel dispersion in accordance with the invention.

By selecting a suitable low-molecular polyol and a long-chain, linear and/or branched polyester polyol, a high crosslinking density is achieved, where the distance between the respective crosslinking centers is sufficiently large to influence the rheological properties positively.

In a particularly preferred embodiment of the present invention, the group capable of forming anions originates from dimethylolpropionic acid and/or 9,10-dihydroxystearic acid.

These specially selected compounds endow the dispersion with clearly improved stability.

In accordance with a further, similarly preferred embodiment of the present invention, the group capable of forming anions comes from a polyester polyol which has at least one free carboxyl group on average per molecule originating from trimellithic acid, trimellithic acid anhydride, dimethylolpropionic acid or di-hydroxystearic acid.

Here too, the functionality crucial to the stability of the dispersion is introduced through an additional compound, so that the danger of gelling during the production of the pre-polymer is prevented, and at the same time increased functionality is achieved for the pre-polymer building blocks.

The capped NCO groups, the same or different, come from the reaction with a compound which in turn results from the reaction of a polyisocyanate with a suitable capping agent. The term "blocking agent" is synonymous with "capping agent."

All compounds which can be used in the production of waterborne basecoats are suitable as polyisocyanates. Examples of these polyisocyanates have been named previously.

Particularly good results are achieved with 1,1-methylenebis(4-isocyanato cyclohexane) (4,4'-dicyclohexyl methane diisocyante, Desmodur W), hexamethylene diisocyante (HMDI, 1,6-hexane diisocyanate, Desmodur H), isophoron diisocyanate (IPDI, 3,5,5-trimethyl-1-isocyanato-3-isocyanatomethyl cyclohexane), 1,4-cyclohexyl diisocyanate (CHDI, trans, trans-1,4diisocyanate cyclohexane), N-isocyanatohexylaminocarbonyl-N,N'-bis(isocyanatohexyl)urea (Desmodur N), 2,4,6-trioxo-1,3,5-tris(6-isocyanatohexyl)-hexahydro-1,3,5-triazine (Desmodur N3300), 2,4,6-trioxo-1, 3,5-tris(5-isocyanato-1,3,3-trimethylcyclohexylmethyl) hexahydro-1,3,5-triazine (Desmodur Z4370).

Quite especially preferred is the use of TMXDI (m-tetramethylxylylene diisocyante) which introduces the capped NCO groups after reaction with a capping agent.

The term "capping agent" is understood to mean those compounds which react with the NCO groups of a polyisocyanate in a way that the polyisocyanate capped in this way is resistant to hydroxyl groups at room temperature. At elevated temperatures, normally in the range of about 90 to 300° C., the capped polyisocyanate reacts by splitting off the capping agent.

Any number of suitable aliphatic, cycloaliphatic or aromatic alkyl monoalcohols as described previously can be used to cap (or block) the polyisocyanates.

Preferred capping agents are malonic esters, acetic acid esters and β-diketones. The blocked polyiscyanates are produced by reacting the capping agent in sufficient quantity with the organic polyisocyanate so that there are no more free isocyanate groups.

Methylethylketoxime is particularly preferred as a capping agent in the sense of the embodiment of the present invention.

In order to counter the risk of gelling, the polyisocyanates described above can be partially capped.

Besides the embodiments described previously, the microgel can have other structural units or segments in its backbone which originate from the customary initial components used in paint chemistry.

For example, polyester A can contain polyurethane segments which originate from the compounds described previously, containing non-blocked polyisocyanates and hydroxyl groups (e.g. dioles, polyester polyols, polylethers).

In accordance with a preferred embodiment, the number-average molecular weight of polymer A is 10,000 at the most, preferably between 1,000 and 8,000.

This achieves an optimal range for a sufficiently high degree of crosslinking and at the same time a sufficiently large mesh width.

In accordance with a further, similarly preferred embodiment of the present invention the microgel has an acid number between 10 and 50 mg KOH/g, specifically between 10 and 30 mg KOH/g.

This achieves sufficient stability in water on the one hand, without excessive hydrophilia on the other, i.e. the originating paints do not exhibit insufficient condensation water resistance.

The emulgator-free microgel dispersion described previously in accordance with the invention is particularly suitable for the production of a multilayer coating, in particular in the automobile industry.

Quite particularly preferred is the use of the emulgator-free microgel dispersion in the color-imparting coating composition, i.e. in a basecoat.

The best results with respect to rheological, mechanical and visual properties are achieved when the microgel percentage, relative to the solids content in the coat obtained therefrom, is between 20 and 85%, preferably between 20 and 65%.

It is also surprising that, in addition to the normal coating silicates, the emulgator-free microgel dispersion in accordance with the invention can be used in waterborne basecoats. In this case the originating paint films do not exhibit insufficient condensation water resistance.

For use in accordance with the invention, the multilayer coating can consist of three different layers, i.e. of
1) a first layer on the electrically conductive substrate consisting of an electrophoretically deposited coating agent;
2) a second, color-imparting layer, obtainable from a waterborne coating composition, which contains the emulgator-free microgel dispersion from the invention; and
3) a third clearcoat layer.

In the case of this multilayer coating of specifically only three different coats, it must be stressed that the resulting multilayer coating also has adequate stone chip resistance which can be attributed to the special properties of the waterborne basecoat paint containing the emulgator-free microgel of the present invention.

It is also possible that the multilayer coating consists of four different layers, i.e. of
1) a first layer on the electrically conductive substrate consisting of an electrophoretically deposited coating agent;
2) a second layer consisting of a primer or a filler;
3) a third, color-imparting layer, obtainable from a waterborne coating composition, which contains the emulgator-free microgel dispersion from the invention; and
4) a fourth clearcoat layer.

An advantage of this four-stage system is that the cured color-imparting coat has a further positive effect on the stone chip resistant properties of the primer-surfacer coat.

By using the emulgator-free microgel in accordance with the invention, a considerably higher film build can be achieved—relative to conventional basecoat paints. The thickness of the cured coat from a coating composition containing the emulgator-free microgel dispersion in accordance with the invention may be between 15 and 55 μm.

The coating agents for electrophoretic deposition are water-based coating compositions with a solids content of about 10 to 20% by weight, which normally include binders, ionic groups or substitutes which can be reacted to ionic groups, and groups capable of chemical crosslinking, and they contain pigments and other normal additives in addition.

Examples of such electro-dip pain DE 28 24 418 A1, DE 33 24 211 A1, EP 0 082 291, EP 0 178 531, EP 0 227 975, EP 0 234 395, EP 0 245 786, EP 0 261 385, EP 0 310 971, EP 0 333 327, EP 0 414 199, EP 0 456 270, EP 0 476 514 and U.S. Pat. No. 3,922,253.

The clearcoat, which in a multilayer coating for automobiles is on top of the color-imparting basecoat, may be obtained by applying and baking a conventional clearcoat composition containing solvents, which is available as a single-component or two-component mixture and which contains one or more basic resins as the film-forming binder. To the extent that the binders are not self-crosslinking, the clearcoat composition may also contain cross-linkers. Polyester, polyurethane and/or poly(meth)acrylate resins, for example, can be used as the film-forming binders (base resins).

In addition to the chemically crosslinking binders and any necessary cross-linkers, these clearcoat paints may contain normal additives, such as catalysts, leveling agents and UV protective agents.

Examples of clearcoat compositions containing solvents in single-component or two-component form are described in DE 38 26 693 A1, DE 40 17 075 A1, DE 41 24 167 A1, DE 41 33 704 A1, DE 42 04 518 A1, DE 42 04 611 A1, EP 0 257 513, EP 0 408 858, EP 0 523 267A and EP 0 557 822.

Examples of water-based clearcoat compositions in single-component or two-component form are described in DE 39 10 829 A1, DE 40 09 931 A1, DE 40 09 932 A1, DE 41 01 696 A1, DE 41 32 430 A1, DE 41 34 290 A1, DE 42 03 510 A1, EP 0 365 098, EP 0 365, 775, EP 0 469 079 and EP 0 546 640, particularly in DE 44 19 216 A1 and DE 44 42 518 A1.

The clearcoat layer can also be produced from a powder paint or a powder clearcoat slurry.

Reference is made to DE 42 22 194 A1, DE 42 27 580 A1, EP 0 509 392, EP 0 509 393, EP 0 522 648, EP 0 544 206, EP 0 555 705, EP 0 652 265, EP 0 666 779 and EP 0 714 958 with respect to the powder clearcoat or the powder clearcoat slurry.

It is also possible to convert the microgel dispersion under the invention into a non-aqueous phase and to use it in coating compositions containing solvents.

To obtain non-aqueous phase microgels, the water must be removed from the microgels in accordance with the invention present in an aqueous phase.

This can be done through any known process, for example, by spray drying, freeze drying or condensation, if necessary under reduced pressure.

After the water has been removed, the microgel of the invention may be present in powder form or as a resinous mass.

In accordance with a preferred variation, the aqueous-phase microgel can be converted into a fluid, organic phase. This can be done by azeotropic distillation. One possible procedure is for the aqueous, emulgator-free microgel dispersion to be added at increased temperature, if necessary at reduced pressure, continuously or discontinuously to a reactor which contains a retarder, i.e. a solvent or a mixture of several solvents of which at least one forms an azeotrope with water.

The reactor is equipped with a suitable condensation device and a water separator with a return to the reactor. After the boiling temperature of the azeotrope is reached, the gaseous azeotropic phase (i.e. retarder and water) rises in the condensation device. The azeotrope condenses there and runs into the water separator. Phase separation between the retarder and the water takes place in the separator. In continuous azeotropic distillation, the retarder returns to the reactor so that only small quantities of retarder have to be used. The water obtained from the separator is free of organic constituents and can be used again to produce the aqueous microgel dispersion in accordance with the invention.

The retarder can be selected from the group of xylol, butylacetate, methylisobutylketone, methylamylketone, pentanol, hexanol or ethylhexanol.

A considerable advantage in this process is that after the retarder has been converted to the organic phase, it remains there and is of advantage for the use of coating compositions containing solvents. With respect to the further use of these microgels present in an organic phase for the production of coating compositions containing solvents, the retarders mentioned are suitable solvents.

Because the retarder is recycled and water simultaneously accumulates with no additional process steps, this process is remarkable for its extraordinary degree of environmental compatibility, since no byproducts requiring disposal are created. Such byproducts accumulate in large quantities with comparable known production processes.

A special form of azeotropic distillation is carried out in such a way that the aqueous, emulgator-free microgel dispersion is added to a mixture of a retarder and a high-boiling organic solvent. This high-boiling organic solvent prevents the microgels from being baked onto the wall of the reactor during reaction to the organic phase.

The high-boiling solvent can be selected from the group of glycol esters, such as butylglycol acetate and/or butyldiglycol acetate.

As in the case of the retarder, the high-boiling solvent is also a normal component in a coating composition containing solvents.

The microgel obtainable in this way can be used in particular for coating compositions containing solvents.

A preferred application of the invention is its use in basecoat paints containing solvents, in particular effect basecoats and clearcoats for the topcoating or finishing of automobiles.

This microgel present in an aqueous phase similarly endows these coating compositions containing solvents with excellent application characteristics and outstanding decorative properties which are exhibited, for example, in a distinctive metallic effect, very good resistance to sagging on vertical surfaces (SCA—sagging control agent), freedom from clouding, resistance to resoftening by the clearcoat, good filling of sanding marks and satisfaction of the usual automobile industry requirements for paint properties.

The microgels can be used equally well for the production of clearcoats containing solvents, coil coating compositions and bakeable paints for industrial applications and house paints for the construction sector.

A further unique feature of this microgel is found in its high resistance to shear. This property allows such microgels to be used for the first time in the production of pigment preparations, in particular as mulling agents for tinting pastes. The advance here is that the tinting pastes produced in this way have a high pigment content and low viscosity at the same time.

EXAMPLES

Producing the Initial Products

Polyester 1:

722.7 g of 1,6-hexanediol and 2621.2 g of a dimerized fatty acid (Pripol® 1013 from Unichema) are weighed in a 4-liter reaction vessel with a stirrer and a packed column and heated so that column head temperature does not exceed 100° C. Maximum esterization temperature is 230° C. At an acid number below 3, the mixture is cooled. A polyester with a calculated molecular weight of 2,000 and a hydroxyl number of 56 is obtained.

Polyester 2:

47.2 g of 1,6-hexanediol and 167.5 g of a trimethylolpropane, 60.9 g of trimethylpropanemonoallylether, 111 g phthalic acid anhydride and 350 g of an isomerized soyabean fatty acid are weighed in a 2-liter reaction vessel with a stirrer and a packed column and heated so that column head temperature does not exceed 100° C. Maximum esterization temperature is 230° C. At an acid number below 10, the mixture is cooled to 150° C. At 150° C., 144 g of trimellithic acid anhydride is added and heated so that the column head temperature does not exceed 180° C. At an acid number of 51, the mixture is cooled and reduced with 146 g of methylethylketone. A polyester with a solids content of 85% is obtained (60 minutes at 120° C.).

Polyester 3:

1274.4 g of 1,6-hexanediol and 1593.6 g of isophthalic acid are weighed in a 4-liter reaction vessel with a stirrer and a packed column and heated so that column head temperature does not exceed 100° C. Maximum esterization temperature is 230° C. At an acid number below 3, the mixture is cooled. A polyester with a calculated molecular weight of 2,100 and a hydroxyl number of 53 is obtained.

Polyester 4:

660.8 g of 1,6-hexanediol and 531.2 g of isophthalic acid and 153.6 g of trimellithic acid anhydride are weighed in a 4-liter reaction vessel with a stirrer and a packed column and heated so that column head temperature does not exceed 100° C. Maximum esterization temperature is 230° C. At an acid number below 3, the mixture is cooled and reduced with 502 g of methylethylketone. A polyester with a solids content of 71% is obtained (60 minutes at 120° C.).

Polyester 5:

1252.8 g of a dimerized fatty acid (Pripol® 1013 from Unichema), 669.1 g of 1,6-hexanediol and 493 g of isophthalic acid are weighed in a 4-liter reaction vessel with a stirrer and a packed column and heated so that column head temperature does not exceed 100° C. Maximum esterization temperature is 230° C. At an acid number below 3, the mixture is cooled and reduced with 860 g of methylethylketone. A polyester with a solids content of 74% is obtained (60 minutes at 120° C.).

Acrylate Dispersion 1 (for Application Examples):

200 g of butylglycol is weighed in a 4-liter reaction vessel with a stirrer and feed vessel and heated to 120° C. At 120° C., a mixture of 285 g of methylethylacrylate, 140 g of 2-ethylhexylacrylate, 60 g of 2-hydroxypropylmethacrylate, 15 g of methacrylic acid and 10 g of tertiary-butyl-2-ethylhexanoate is dosed evenly within the space of 3 hours. After the feed is completed, the mixture is repolymerized for 0.5 hours. Then a mixture of 10 g of butylglycol and 1 g of tertiary butyl-2-ethylhexanoate is dosed in the space of 0.1 hours. After the feed is completed, the mixture is repolymerized for 1.5 hours.

Then 15.5 g of dimethylethanolamine and 1630 g of deionized water are added. A stable dispersion with an acid number of 19 and a solids content of 22% is obtained (30 minutes at 180° C.).

Polyurethane Dispersion 1:

614.9 g of tetramethylxylylenediisocyanate is placed in a 4-liter reaction vessel with a return condenser and 94 g of methylethylketoxime is added within the space of a half hour while stirring. After an additional hour of reaction time at 70° C., 180 g of polyester 1, 120.6 g of dimethylolpropionic acid, 15.7 g of trimethylolpropanemonoallylether, 112.5 g of di-trimethylolpropane, 0.9 g of dibutyltindilaurate and 612 g of methylethylketone are weighed into the reaction vessel. At 85° C., it is pushed until the isocyanate content is 0.25%. Then 8.5 g of methylethylketoxime is added and at 85° C. it is pushed to an isocyanate content of <0.02%. Then a mixture of 31.1 g of dimethylethanolamine and 1400 g of deionized water is added. After vacuum distillation, in which the methylethylketone is removed, a dispersion with a solids content of 42% is obtained (60 minutes at 120° C.).

Polyurethane Dispersion 2:

273.6 g of tetramethylxylylenediisocyanate is placed in a 2-liter reaction vessel with a return condenser and 48.7 g of methylethylketoxime is added within the space of a half hour while stirring. After an additional hour of reaction time at 70° C., 216.3 g of polyester 5, 44.8 g of dimethylolpropionic acid, 60 g di-trimethylolpropane, 0.3 g of dibutyltindilaurate and 187.3 g of methylethylketone are weighed into the reaction vessel. At 85° C., it is pushed until the isocyanate content is 0.45%. Then 7.6 g of methylethylketoxime is added and pushed to an isocyanate content of <0.02% at 85° C. Then a mixture of 20.5 g of dimethylethanolamine and 919 g of deionized water is added. After vacuum distillation, in which the methylethylketone is removed, a dispersion with a solids content of 34% is obtained (60 minutes at 120° C.).

Polyurethane Dispersion 3:

300 g of polyester 3, 60.3 g of dimethylolpropionic acid, 37.5 g of di-trimethylolpropane, 293.3 g of tetramethylxylylenediisocyanate, 0.5 g dibutyltindilaurate and 400 g methylethylketone are weighed in a 4-liter reaction vessel with a return condenser and heated to 80° C. This mixture is maintained at 80° C. until the isocyanate content is 2.01%. Then a mixture of 31.9 g of dimethylethanolamine, 90.9 g of adipinic acid bishydride and 1489 g of deionized water is added. A dispersion with a solids content of 29% is obtained (60 minutes at 120° C.

Polyurethane Dispersion 4 (for Application Example):

249.4 g of polyester 3, 15.9 g of dimethylolpropionic acid, 86.9 g tetramethylxylylenediisocyante, 0.2 g of dibutyltindilaurate and 117.2 g of methylethylketone are weighed in a 4-liter reaction vessel with a return condenser and heated to 85° C. This mixture is maintained at 85° C. until the isocyanate content is 1.95%. Then 76.9 g of a di-trimethylolpropanemonolaurinic acid ester is added and pushed to an isocyanate content of <0.02% at 85° C. Then a mixture of 10.7 g of dimethylethanolamine and 1080 g of deionized water is added. After vacuum distillation, in which the methylethylketone is removed, a dispersion with solids content of 29% is obtained (60 minutes at 120° C.).

Production of the Microgel Dispersions in Accordance with the Invention:

Microgel Dispersion 1:

504 g of deionized water are weighed in a 2-liter reaction vessel with return condenser and heated to 98° C. 10% by weight of a mixture of 361.2 g of the polyurethane dispersion 1, 2.2 g of dimethylethanolamine, 195 g of deionized water, 17.6 g of butanediolmonoacrylate, 54.8 g of styrene, 80.1 g of butylmethacrylate and 4.9 g of tertiary butyldiolmonoacrylate are added while stirring and mixed for 15 minutes at 98° C. Then the remaining 90% by weight of this mixture is dosed uniformly within 3 hours. After the feed is completed, a sample of the entire reaction mixture diluted with THF is already showing turbidity. After the feed is completed, it is repolymerized for 0.5 hours. Then a mixture of 3 g of methylethylketone and 0.7 g of tertiary butyl-2-ethylhexanoate is dosed within 0.1 hours. After completion of this feed, the initial mixture is maintained at 98° C. for a further 8 hours and then cooled. A stable dispersion with a solids content of 25% is obtained (60 minutes at 120° C.). A sample of this dispersion diluted with tetrahydrofuran exhibits severe turbidity.

Microgel Dispersion 2:

510 g of deionized water, 4.8 g of dimethylethanolamine and 65.5 g of polyester 2 are weighed in a 2-liter reaction vessel with return condenser and heated to 96° C. 10% by weight of a mixture of 495.2 g of polyurethane dispersion 1, 2.2 g dimethylethanolamine, 397 g of deionized water, 16 g butanediolmonoacrylate, 49.8 g styrene, 72.6 g butylmethacrylate and 2 g of 2,2'-azo-bis-isobutylnitrile (AIBN) are added while stirring and mixed for 15 minutes at 96° C. Then the remaining 90% by weight of this mixture is dosed evenly within the space of 2.5 hours. After the mixture feed is completed, a sample of the entire reaction mixture reduced with THF is already exhibiting turbidity. After the addition is completed, it is repolymerized for 0.5 hours. Then a mixture of 3 g of methyethylketone and 0.4 g of 2,2'-azo-bis-isobutylnitrile (AIBN) is dosed within the space of 0.1 hours. After the addition is completed, the preparation is maintained at 98° C. for a further 8 hours and then cooled. A stable dispersion with a solids content of 25% is obtained (60 minutes at 120° C.). A sample of this dispersion diluted with tetrahydrofuran exhibits severe turbidity.

Microgel Dispersion 3:

268.4 g of tetramethylxylylenediisocyanate is placed in a 2-liter reaction vessel with return condenser and while agitating 34.8 g of methylethylketoxime is dosed in one half hour. After another hour of reaction time at 70° C., 211.9 g of polyester 4, 26.8 g dimethylpropionic acid, 50 g of di-triemthylolpropane, 0.5 g of dibutyltinlaurate and 274 g of methylethylketone are weighed into the reaction vessel. It is pushed at 80° C. until the isocyanate content is 1.80%. Then a mixture of 10.7 g of dimethylethanolamine, 23.7 g of hydrazine hydrate (80% in water) and 500 g deionized water is added. A sample of this dispersion reduced with tetrahydrofuran exhibits no visually perceptible turbidity at this time. While being heated to 98° C., the methylethylketone is removed by distillation through a water separator. After two additional hours of reaction time at 98° C. and subsequent cooling, 7.2 g of dimethylethanolamine is added. A dispersion with a solids content of 34% is obtained (60 minutes at 120° C.). A sample of this dispersion reduced with tetrahydrofuran exhibits severe turbidity.

Microgel Dispersion 4:

500 g of polyurethane dispersion 2 and 950 g of polyurethane dispersion 3 are weighed in a 2-liter reaction vessel with return condenser. A sample of this mixture reduced with tetrahydrofuran exhibits no visually perceptible turbidity at this time. Then it is heated to 98° C. While it is being heated, the methylethylketone is removed by distillation through a water separator. After 1.5 hours at 98° C., a mixture of 8 g of dimethylethylanolamine and 410 g of deionized water is added. After another 4 hours at 98° C., it is cooled. A dispersion with a solids content of 28% is obtained (60 minutes at 120° C.). A sample of this dispersion reduced with tetrahydrofuran exhibits severe turbidity.

Use of the Microgel Dispersions Under the Invention

Application Example 1

To produce a metallic water-based paint, 93.1 g of the polyurethane dispersion 4, 216 g of microgel dispersion 1 in accordance with the invention, 165.5 g of acrylate dispersion 1, 19.4 g of a commercial melamine resin (Cymel® 327 from Dino Cytec), 42.9 g of a commercial aluminum bronze, previously stirred to a paste in 56.2 g of butylglycol and 31.6 g of n-butanol and a mixture of 19.8 g of a commercial acrylate thickener (Latekoll® D from BASF) and 50 g of deionized water are processed into a paint. The pH value is adjusted to 8.00 to 8.30 with dimethylethanolamine and the viscosity is adjusted to 100 mPa·s with deionized water (measured at $1{,}000\ \text{s}^{-1}$).

Application Example 2

The same procedure is followed as in example 1. However, the 216 g of microgel dispersion 1 is replaced with 216 g of microgel dispersion 2 in accordance with the invention.

Application Example 3

The same procedure is followed as in example 1. However, the 216 g of microgel dispersion 1 is replaced with 158.8 g of microgel dispersion 3 in accordance with the invention.

Application Example 4

The same procedure is followed as in example 1. However, the 216 g of microgel dispersion 1 is replaced with 192.9 g of microgel dispersion 4 in accordance with the invention.

Comparative Example 1

The same procedure is followed as in example 1. However, the 216 g of microgel dispersion 1 is replaced with 216 g of microgel dispersion produced in accordance with the example in DE 39 40 316.

Steam Jet Test:

The water-based basecoats produced in accordance with the aforementioned application examples are applied with a spray gun onto a 5×10 cm coated polycarbonate substrate in a climate-controlled spray booth so that a dry coating thickness of 15-18 µm is obtained. After intermediate drying of 10 minutes at 80° C., the painted substrates receive a standard automobile industry 2K clearcoat for plastics finishing with a dry coating thickness of 40-45 µm, and the coats are then baked for 45 minutes at 80° C.

An X-shaped cross about 10 cm in length with legs intersecting at about 30° is incised on these coated test specimens following Sikkens, using an Erichsen 463 scratch stylus with a 1-mm cutting tip.

The test specimen and the steam jet nozzle are anchored so that the center of the jet is located over the cross, the steam jet is parallel to one of the cuts, the distance of the steam jet nozzle is 10 cm from the test specimen, and the contact angle is 90°.

The test specimen is sprayed with water at 60° C. flowing at 11-11.5 l/min in a trapezoidal jet pattern for 60 seconds.

The analysis is made by visual evaluation:
No chipping or creep up to a 1 mm maximum is O.K.
Creep of >1 mm up to chipping over large areas is not O.K.
The individual results can be read from the following table:

TABLE I

| Paint samples | Adhesion | Chipping after steam jet test |
| --- | --- | --- |
| Sample 1 | Gt 0 | 1 mm |
| Sample 2 | Gt 0 | 0 mm |
| Sample 3 | Gt 0 | 1 mm |
| Sample 4 | Gt 0 | 1 mm |
| Comparative sample 1 | Gt 3 | 9 mm |

Table I shows clearly that, through the use of the microgel dispersions under the invention, finishes are obtained which excel due to good adhesion to polycarbonate. The examples in accordance with the invention further show very good aluminum flake orientation and stability as well as outstanding topcoat holdout.

The invention claimed is:

1. A microgel dispersion obtained by intermolecular or intramolecular crosslinking in an aqueous medium of a pre-polymer, wherein the pre-polymer has at least two capped NCO groups and at least three groups having at least one active hydrogen atom bonded to a nitrogen atom; or at least three capped NCO groups and at least two groups having at least one active hydrogen atom bonded to a nitrogen atom; at least one segment in the backbone of the polyester originating from a triol, polyol, linear, or branched polyester polyol; and at least one group capable of forming anions, wherein in the intermolecular or intramolecular crosslinking the nitrogen atoms carrying at least one active hydrogen atom react with the blocked NCO groups while forming urea compounds and releasing the blocking agent; and the microgel dispersion is emulgator-free.

2. Microgel dispersion according to claim 1, wherein more than 70% of the groups with at least one active hydrogen atom bonded to a nitrogen atom are reacted while forming polyurea compounds.

3. Microgel dispersion according to claim 1, wherein the group having at least one hydrogen atom bonded to a nitrogen atom is an $NH_2$ group.

4. Microgel dispersion according to claim 1, wherein the pre-polymer has a number-average molecular weight of more than 2,000; an acid number between 10 and 30 mg KOH/g; at least one segment originating from a diisocyanate as the hard segment.

5. Microgel dispersion according to claim 1, wherein the triol has 3 to 24 carbon atoms and is preferably trimethylolpropane.

6. Microgel dispersion according to claim 1, wherein the polyol has 3 to 12 carbon atoms and is preferably di-trimethylolpropane.

7. Microgel dispersion according to claim 1, wherein the linear and/or branched polyester polyol can be obtained from the polycondensation of a polycarboxylic acid having at least one diol or polyol.

8. Microgel dispersion according to claim 7, wherein the linear or branched polyester polyol has a number-average molecular weight between 300 and 4,000 and a hydroxyl number between 28 and 580.

9. Microgel dispersion according to claim 1, wherein the capped NCO groups are the same or different and result from the reaction of a diisocyanate selected from the group consisting of 1,1-methylenebis(4-isocyanatocyclohexane) (4,4'-dicyclohexylmethane diisocyanate, Desmodur W), hexamethylene diisocyanate (HMDI, 1.6-diisocyanate hexane, Desmodur H), isophorondiisocyanate IPDI, 3,5,5-tri-methyl-1-isocyanato-3-iscyanatomethylcyclohexane), 1,4-cyclohexlyldiisocyanate (CHDI, trans,-trans-1,4-diisocyanato-cyclohexane), and 1,3-bis(1-isocyanato-1-methylethyl)benzene (TMXDI, m-tetramethylxylylenediisocyanate), with a capping agent.

10. Microgel dispersion according to claim 1, wherein the group capable of forming anions originates from dimethylprpionic acid, 9,10-dihydroxystearic acid and/or from a polyestey polylol having at least one group capable of forming anions.

11. Microgel dispersion according to claim 1, wherein the number-average molecular weight of the pre-polymer is at the most 10,000, preferably between 3,000 and 7,000.

12. Microgel dispersion according to claim 1, wherein the crosslinking is carried out in the prescence of an additional polymer with an OH number between 30 and 400 and an acid number between 1 and 150, selected from the group of polyarcrylates, polyesters and polyurethanes.

13. Microgel dispersion according to claim 1, wherein the crosslinking is carried out together with an emulsion polymerization, using
   at least one monomer compound which contains at least one radically polymerizable double bond, and
   at least one monomer compound containing hydroxyl groups and at least one radically polymerizable double bond.

14. Microgel dispersion according to claim 1, wherein the reaction mixture originating from the crosslinking subsequently undergoes emulsion polymerization of at least one monomer compound which contains at least one radically polymerizable double bond and has at least one hydroxyl group.

15. Microgel dispersion according to claim 13 or 14, wherein emulsion polymerization is carried out in the presence of additionally at least one monomer compound without hydroxyl groups which contains at least one radically polymerizable double bond.

16. A microgel dispersion obtained by crosslinking of a polymer A and a polymer B, wherein polymer A, dispersed in an aqueous medium with polymer B, has at least two capped NCO groups and polymer B has at least three groups having at least one active hydrogen atom bonded to a nitrogen atom; polymer A, dispersed in an aqueous medium with polymer B, has at least three capped NCO groups and polymer B has at least two groups having at least one active hydrogen atom bonded to a nitrogen atom; polymer A, dispersed in an aqueous medium with a polyamine, has at least two capped NCO groups and the polyamine has at least three groups having at least one active hydrogen atom bonded to a nitrogen atom; or polymer A, dispersed in an aqueous medium with a polyamine, has at least three capped NCO groups and the polyamine has at least two groups having at least one active hydrogen atom bonded to a nitrogen atom; wherein the polymer A and/or polymer B and the polyamine each have at least one segment in the backbone of the polyester originating from a diol, polyol, polyether and/or a polyester polyol, and at least one group capable of forming anions, wherein during crosslinking the nitrogen atoms carrying at least one active hydrogen atom react with the blocked NCO groups while forming urea compounds and releasing the blocking agent: and the microgel dispersion is emulgator-free.

17. Microgel dispersion according to claim 16, wherein the number-average molecular weight of polymer A and/or polymer B is at most 10,000, preferably between 2,000 and 8,000.

18. Microgel dispersion according to claim 16, wherein polymer A additionally contains two non-capped NCO groups and polymer A undergoes chain elongation/extension before crosslinking with polymer B or the polyamine, with a diamine and/or polyamine.

19. Microgel dispersion according to claim 18, wherein the diamine or polyamine has at least one group capable of forming anions.

20. Microgel dispersion according to claim 19, wherein the group capable of forming anions originates exclusively from the diamine or polyamine.

21. Microgel dispersion according to claim 20, wherein the group capable of forming anions is a sulphonic acid group.

22. Emulgator-free microgel dispersion according to claim 21, wherein at least one group capable of forming anions is present per 8,000 number-average mole weight units.

23. A microgel dispersion obtained by crosslinking of a polymer B with a capped polyisocyanate, wherein the capped isocyanate is not dispersible in water and has at least two capped NCO groups; polymer B, dispersed in an aqueous medium, has at least three groups having at least one active hydrogen atom bonded to a nitrogen atom; or the polymer B, dispersed in an aqueous medium with a polyamine, has at least two groups having at least one active hydrogen atom bonded to a nitrogen atom; wherein polymer B has at least one segment in the backbone of the polyester originating from a diol, polyol, polyether and/or a polyester polyol, and at least one group capable of forming anions wherein during crosslinking the nitrogen atoms carrying at least one active hydrogen atom react with the blocked NCO groups while forming urea compounds and releasing the blocking agent; and the microgel dispersion is emulgator-free.

24. Microgel dispersion according to claim 23, wherein an additional polymer C with an OH number between 30 and 400 and an acid number between 1 and 150 is crosslinked, selected from the group of polyacrylates, polyesters and polyurethanes.

25. Microgel dispersion according to claim 23, wherein the crosslinking is carried out together with an emulsion polymerization of at least one monomer compound containing hydroxyl groups which contains at least one radically polymerizable double bond.

26. Microgel dispersion according to claim 23, wherein the reaction mixture originating from the crosslinking subsequently underegoes emulsion polymerization of at least one monomer compound which contains at least one radically polymerizable double bond and at least one hydroxyl group.

27. Microgel dispersion according to claim 25 or 26, wherein the emulsion polymerization is carried out in the presence additionally of at least one monomer compound without hydroxyl groups which contains at least one radically polymerizable double bond.

28. Microgel dispersion according to claim 23, wherein polymer A and/or B has a number-average molecular weight of more than 800; an acid number between 10 and 70 mg KOH/g.

29. Microgel dispersion according to claim 23, wherein the diol or polyol has 2 to 36 carbon atoms and is selected from the group of trimethylolpropanemonoallyether, di-trimethylolpropane and hydroxylated fatty acid compounds.

30. Microgel dispersion according to claim 23, wherein the polyester polyol has a number-average molecular weight between 200 and 6,000, an OH number between 20 and 550 and an acid number less than 5.

31. Microgel dispersion according to claim 23, wherein the group capable of forming anions originates from dimethylolpropionic acid and/or 9,10-dihydroxystearic acid.

32. Microgel dispersion according to claim 23, wherein the group capable of forming anions originates from a polyester polyol which has at least one free carboxyl group on average per molecule which originates from trimellithic acid, trimellithic acid anhydride, dimethyloipropionic acid or dihydroxystearic acid.

33. Microgel dispersion according to claim 23, wherein at least one of the groups of the polymer with at least one active hydrogen atom bonded to a nitrogen atom originates from a di- or polyamine.

34. Microgel dispersion according to claim 23, wherein the capped NCO groups are different or the same and originate from the reaction of a diisocyanate selected from the group consisting of TMXDI (m-tetramethylxylylenediisocyanate), 1,1-methylenebis(4-isocyanatocyclohexane), (4,4'-dicyclohexylmethanediisocyanate, Desdomur W), hexamethylenediisocyanate (HMDI, 1,6-diisocyanatohexane, Desmodur H), isophorondiisocyanate (IPDI,3,5,5-trimethyl-1-isocyanato-3-isocyanatomethycyclohexane), and 1,4-cyclohexyldiisocyanate (CHDI, trans-, trans-1,4-diisocyanatocyclohexane) or form aliphatic triisocyanates selected from the group consisting of N-isocyanatohexylaminocarbonyl-N,N'-bis(isocyanatohexyl)urea (Desmodur N), 2,4,6-trioxo-1,3,5-tris(6-isocyanatohexyl)hexahydro- 1,3,5-triazine (Desmodur N3300), and 2,4,6-trioxo-1,3,5-(5-isocyanato-1,3,3-trimethylcyclohexylmethyl)hexahydro-1,3,5-triazine (Desmodur Z4370) with a capping agent.

35. An acrylate-modified microgel dispersion obtained by emulsion polymerization of at least one monomer compound (A) containing hydroxyl groups which contains at least one radically polymerizable double bond in the presence of an aqueous dispersion of a polymer (B), the latter containing at least two capped NCO groups; at least one segment in the backbone of the pre-polymer originating from a diol, polyol, polether and/or polyester polyol; and at least one group capable of forming anions, wherein during emulsion polymerization the hydroxyl groups of the monomer compound (A) react with the capped NCO groups of polymer (B) while forming urea compounds and releasing the blocking agent; and the microgel dispersion is emulgator-free.

36. Microgel dispersion according to claim 35, wherein the emulsion polymerization is carried out additionally in the presence of at least one monomer compound (C) free of hydroxyl groups which contains at least one radically polymerizable double bond.

37. Microgel dispersion according to claim 35, wherein the emulsion polymerization is carried out in the presence of an additional polymer (D) with an OH number between 30 and 400 and an acid number between 1 and 150, selected from the group of polyacrylates, polyesters and polyurethanes.

38. Microgel dispersion according to claim 35, wherein the reaction mixture originating from the emulsion polymerization undergoes further emulsion polymerization with at least one monomer compound which contains at last one radically polymerizable double bond and at least one hydroxyl group.

39. Microgel dispersion according to claim 35, wherein the additional emulsion polymerization is carried out in the presence of at least one monomer compound without hydroxyl groups, which contains at least one radically polymerizable double bond.

40. Microgel dispersion according to claim 35, wherein polymer (B) has a number-average molecular weight of more than 800; and an acid number between 20 and 150 mg KOH/g.

41. Microgel dispersion according to claim 35, wherein the diol or polyol has 2 to 36 carbon atoms and is preferably selected from the group of trimethylolpropane monoallyether, di-trimethylolpropane and hydroxylated fatty acid compounds.

42. Microgel dispersion according to claim 35, wherein the polyester polyol has a number-average molecular weight between 200 and 6,000, an OH number between 20 and 550 and an acid number less than 5.

43. Microgel dispersion according to claim 35, wherein the groupo capable of forming anions originates from dimethylolpropionic acid and/or 9,10-dihydroxyl stearic acid.

44. Microgel dispersion according to claim 35, wherein the group capable of forming anions originates from a polyester polyol which has at least one free carboxyl group on average per molecule which originates from trimellithic acid, trimellithic acid anhydride, dimethyloipropionic acid or dihydroxystearic acid.

45. Microgel dispersion according to claim 35, wherein the capped NCO groups are the same or different and originate from the reaction of a diisocyanate selected from the group consisting of TMXDI (m-tetramethylxylylenediisocyanate), 1,1-methylenebis(4-isocyanatocyclohexane), 4,4'-dicyclomethanediisocyanate, Desmodur W), hexamethylenediisocyanate (HMDI, 1,6-diisocyanatohexane, Desmodur H), isophorondiisocyanate (IPDI, 3,5,5-trimethyl-1-isocyanato-3-isocyanatomethylcyclohexane), and 1,4-cyclohexyldiisocyanate (CHDI, trans,-trans-1,4-diisocyanatocyclohexane) or from aliphatic triisocyanates selected from the group consisting of N-isocyanatohexylaminocarbonyl-N,N-bis-(isocyanatohexyl)urea (Desmodur N), 2,4,6-trioxo-1,3,5-tris(6-isocyanatohexyl)-hexahydro- 1,3,5-triazine (Desmodur N 3300), and 2,4,6-trioxo-1,3,5-tris(5-isocyanato-1,3,3-trimethylcyclohexymethyl)hexahydro-1,3,5-triazine (Desmodur Z4370) with a capping agent.

46. Microgel dispersion according to claim 35, wherein the number-average molecular weight of polymer (B) is at the most 10,000, preferably between 1,000 and 8,000.

47. Microgel dispersion according to claim 35, wherein the microgel has an acid number between 10 and 50 mg KOH/g.

48. Microgel dispersion according to claim 16, wherein an additional polymer C with an OH number between 30 and 400 and an acid number between 1 and 150 is crosslinked, selected from the group of polyacrylates, polyesters and polyurethanes.

49. Microgel dispersion according to claim 16, wherein the crosslinking is carried out together with an emulsion polymerization of at least one monomer compound containing hydroxyl groups which contains at least one radically polymerizable double bond.

50. Microgel dispersion according to claim 16, wherein the reaction mixture originating from the crosslinking subsequently undergoes emulsion polymerization of at least one monomer compound which contains at least one radically polymerizable double bond and at least one hydroxyl group.

51. Microgel dispersion according to claim 49 or 50, wherein the emulsion polymerization is carried out in the presence additionally of at least one monomer compound without hydroxyl groups which contains at least one radically polymerizable double bond.

52. Microgel dispersion according to claim 16, wherein polymer A and/or B has a number-average molecular weight of more than 800; an acid number between 10 and 70 mg KOH/g.

53. Microgel dispersion according to claim 16, wherein the diol or polyol has 2 to 36 carbon atoms and is preferably selected from the group of trimethylolpropanemonoallyether, di-trimethylolpropane and hydroxylated fatty acid compounds.

54. Microgel dispersion according to claim 16, wherein the polyster polyol has a number-average molecular weight between 200 and 6,000, an OH number between 20 and 550 and an acid number less than 5.

55. Microgel dispersion according to claim 16, wherein the group capable of forming anions originates from dimethylolpropionic acid and/or 9,10-dihydroxystearic acid.

56. Microgel dispersion according to claim 16, wherein the group capable of forming anions originates from a polyester polyol which has at least one free carboxyl group on average per molecule which originates from trimellithic acid, trimellithic acid anhydride, dimethyloipropionic acid or dihydroxystearic acid.

57. Microgel dispersion according to claim 16, wherein at least one of the groups of the polymer with at least one active hydrogen atom bonded to a nitrogen atom originates from a di- or polyamine.

58. Microgel dispersion according to claim 16, wherein the capped NCO groups are different or the same and originate from the reaction of a diisocyanate selected from the group consisting of TMXDI (m-tetrainethylxylylenediisocyanate), 1,1-methylenebis(4-isocyanatocyclohexane), (4,4'-dicyclohexylmethanediisocyanate, Desdomur W), hexamethylenediisocyanate (HMDI, 1,6-diisocyanatohexane, Desmodur H), isophorondiisocyanate (IPDI, 3,5,5-trimethyl-1-isocyanato-3-isocyanatomethycyclohexane), and 1,4-cyclohexyldiisocyanate (CHDI, trans-, trans-1,4-diisocyanatocyclohexane) or form aliphatic triisocyanates selected from the group consisting of N-isocyanatohexylaminocarbonyl-N,N'-bis(isocyanatohexyl)urea (Desmodur N), 2,4,6-trioxo- 1,3,5-tris(6-isocyanatohexyl)hexahydro-1,3,5-triazine (Desmodur N3300), and 2,4,6-trioxo-1,3,5-(5-isocyanato-1,3,3-trimethylcyclohexylmethyl)hexahydro-1,3,5-triazine (Desmodur Z4370) with a capping agent.

* * * * *